(12) United States Patent
Chen et al.

(10) Patent No.: US 11,114,716 B1
(45) Date of Patent: Sep. 7, 2021

(54) SECONDARY BATTERY, BATTERY PACK AND DEVICE USING BATTERY

(71) Applicant: Contemporary Amperex Technology Co., Limited, Ningde (CN)

(72) Inventors: Xinxiang Chen, Ningde (CN); Peng Wang, Ningde (CN); Yuanbao Chen, Ningde (CN); Zhijun Guo, Ningde (CN); Yulian Zheng, Ningde (CN); Chengdu Liang, Ningde (CN); Wei Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/136,786

(22) Filed: Dec. 29, 2020

Related U.S. Application Data

(63) Continuation of application No. PCT/CN2020/090349, filed on May 14, 2020.

(51) Int. Cl.
 H01M 50/148 (2021.01)
 H01M 50/183 (2021.01)
 (Continued)

(52) U.S. Cl.
 CPC ....... *H01M 50/148* (2021.01); *H01M 10/058* (2013.01); *H01M 10/0525* (2013.01);
 (Continued)

(58) Field of Classification Search
 CPC ............. H01M 50/148; H01M 50/636; H01M 10/058; H01M 10/0525; H01M 50/183; H01M 2220/20
 (Continued)

(56) References Cited

U.S. PATENT DOCUMENTS

| 9,985,272 B2 | 5/2018 | Guen |
| 2013/0095374 A1* | 4/2013 | Kim ..................... H01M 50/543 |
| | | 429/179 |

FOREIGN PATENT DOCUMENTS

| CN | 202042559 U | 11/2011 |
| CN | 203398175 U | 1/2014 |
| (Continued) | | |

OTHER PUBLICATIONS

Written Opinion of the International Searching Authority issued in International Application No. PCT/CN2020/090349, dated Feb. 10, 2021, 7 pages.

*Primary Examiner* — Gary D Harris
(74) *Attorney, Agent, or Firm* — Sterne, Kessler, Goldstein & Fox P.L.L.C.

(57) ABSTRACT

A secondary battery, a battery pack and a device using the battery are provided, wherein the end cover assembly includes: an end cover with a through hole for injection of electrolyte and an accommodating part, the accommodating part is arranged on a side far away from a shell of the end cover and is arranged along a circumferential direction of the through hole; a sealing element; and a cover body for covering at least part of the sealing element, the cover body is rotatable and includes a limiting part; when the cover body rotates to a first position, the limiting part is located inside the accommodating part to limit separation of the cover body from the end cover; when the cover body rotates to a second position, the limiting part and the accommodating part are misplaced to realize separation of the cover body from the end cover.

20 Claims, 12 Drawing Sheets

(51) Int. Cl.
  *H01M 10/058* (2010.01)
  *H01M 50/636* (2021.01)
  *H01M 10/0525* (2010.01)

(52) U.S. Cl.
  CPC ....... *H01M 50/183* (2021.01); *H01M 50/636* (2021.01); *H01M 2220/20* (2013.01)

(58) Field of Classification Search
  USPC ........................................................ 429/156
  See application file for complete search history.

(56) References Cited

FOREIGN PATENT DOCUMENTS

| | | |
|---|---|---|
| CN | 205069696 U | 3/2016 |
| CN | 206076297 U | 4/2017 |
| CN | 207818649 U | 9/2018 |
| CN | 209169284 U | 7/2019 |
| CN | 209993625 U | 1/2020 |
| JP | 2014099266 A | 5/2014 |

\* cited by examiner

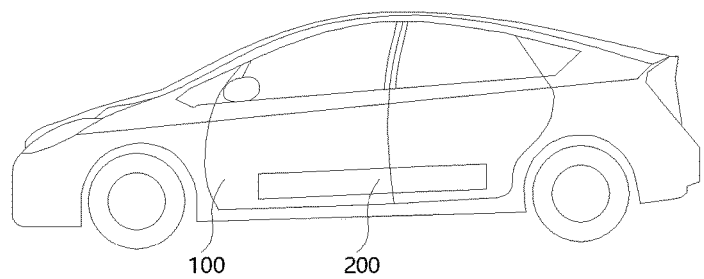
Fig. 1-A
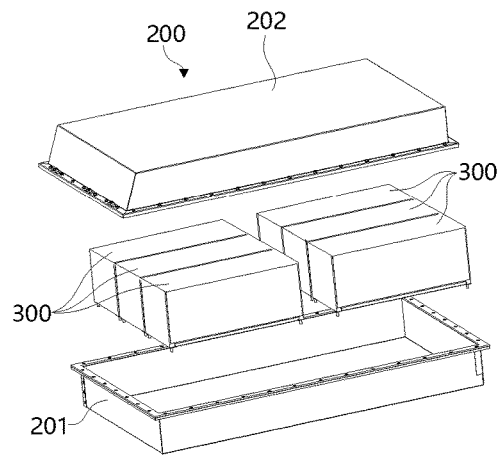
Fig. 1-B
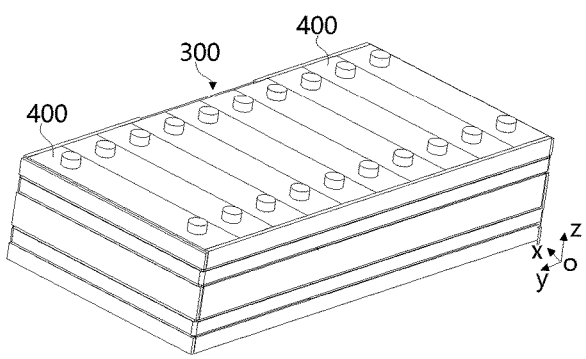
Fig. 1-C
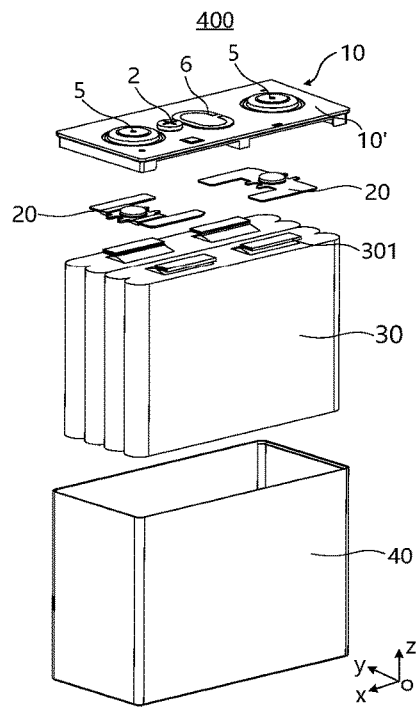
Fig. 1-D

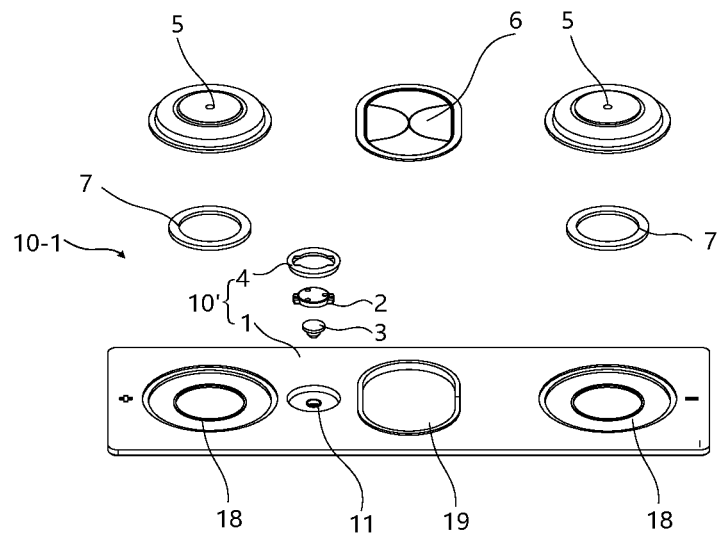
Fig. 2
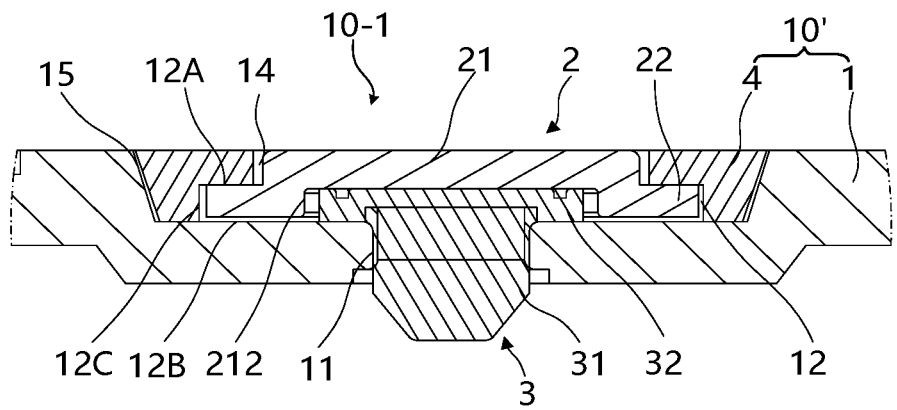
Fig. 3
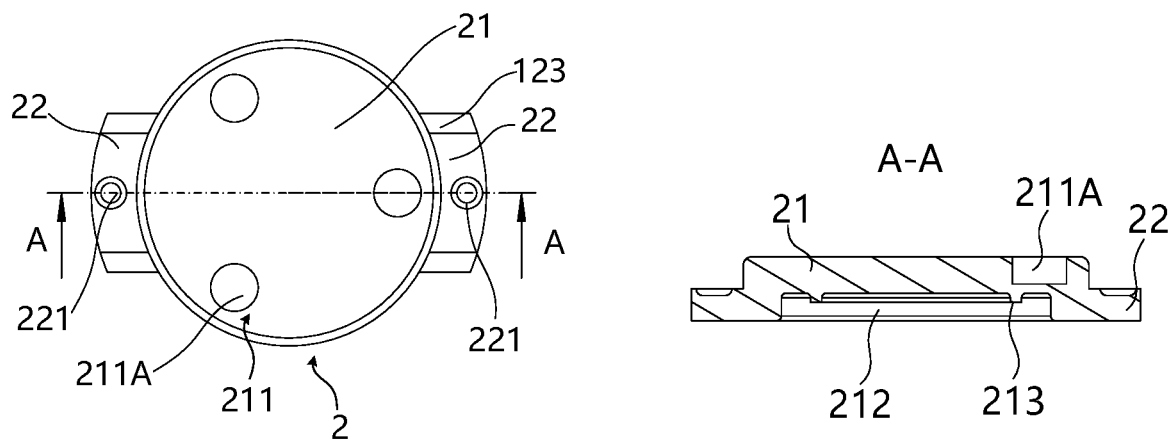
Fig. 4A
Fig. 4B

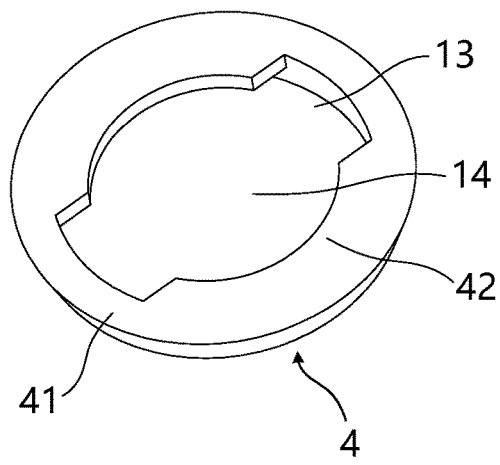
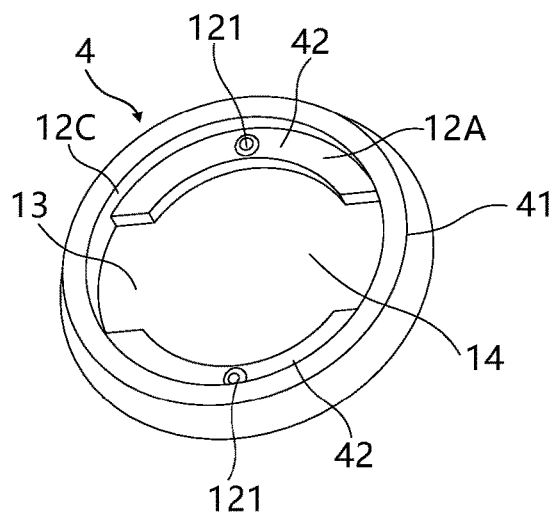
Fig. 5A
Fig. 5B
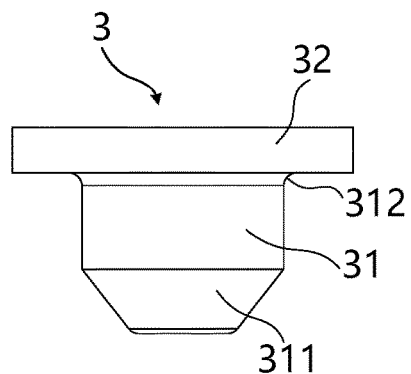
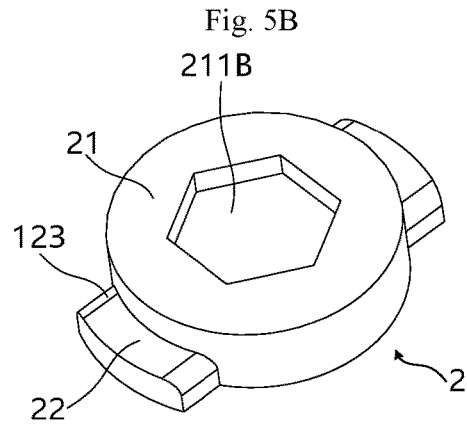
Fig. 6
Fig. 7
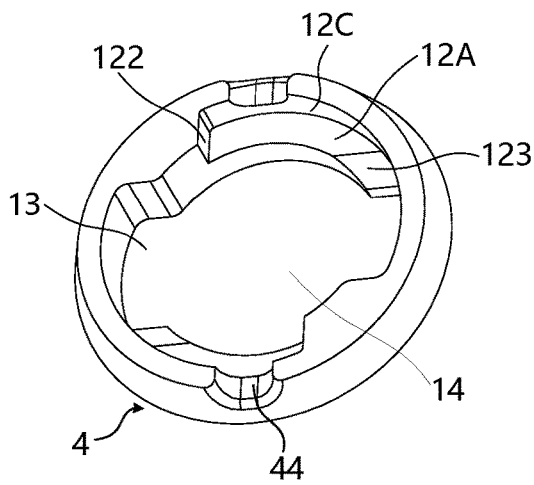
Fig. 8A

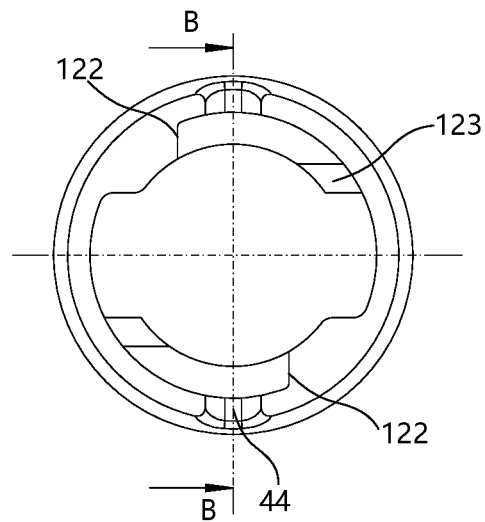
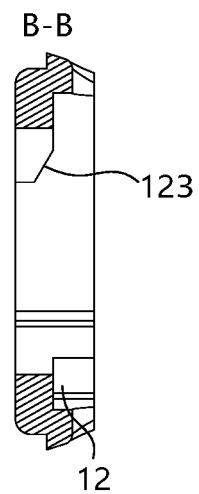
Fig. 8B          Fig. 8C
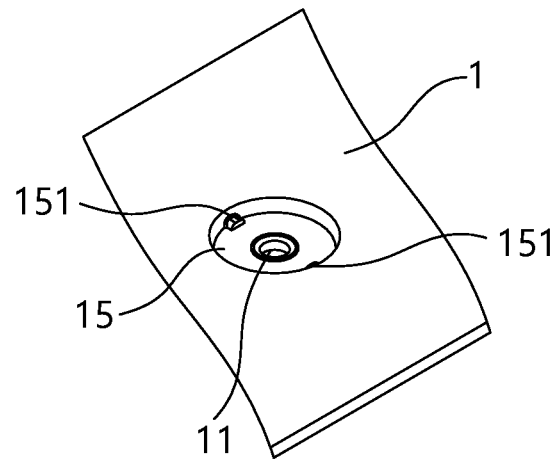
Fig. 9
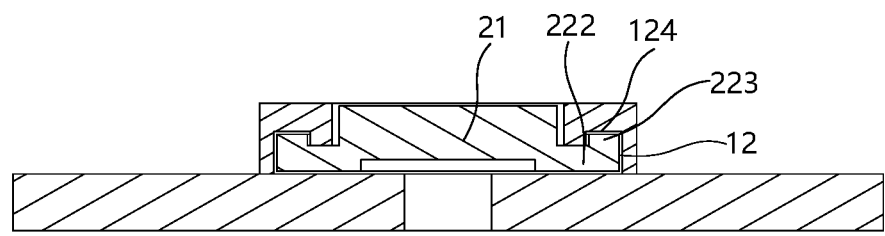
Fig. 10A

SECONDARY BATTERY, BATTERY PACK AND DEVICE USING BATTERY

CROSS-REFERENCE TO RELATED APPLICATION

The present application is a continuation of International Application No. PCT/CN2020/090349, filed on May 14, 2020, the disclosures of which are hereby incorporated in their entirety by reference.

TECHNICAL FIELD

The present disclosure relates to the technical field of batteries, in particular to a secondary battery, a battery pack and a device using the battery.

BACKGROUND

Owing to such advantages as high energy density, high power density, multiple cycles and long storage time, lithium-ion batteries and the like have been widely used in electric vehicles.

However, the extension of the service life of batteries of an electric vehicle has always been a problem in the industry.

SUMMARY

According to a first aspect of the present disclosure, an end cover assembly is provided, including:
- an end cover, provided with a through hole for injection of electrolyte and an accommodating part, wherein the accommodating part is arranged on a side, far away from a shell, of the end cover and is arranged along a circumferential direction of the through hole;
- a sealing element, sealing the through hole; and
- a cover body, covering at least part of the sealing element, wherein the cover body is rotatable and includes a limiting part;
- wherein when the cover body rotates to a first position, the limiting part is located inside the accommodating part to limit separation of the cover body from the end cover; when the cover body rotates to a second position, the limiting part and the accommodating part are misplaced along the circumferential direction of the through hole, to realize separation of the cover body from the end cover.

In some embodiments, the cover body further includes a main body part which covers at least part of the sealing element, and the limiting part is connected to the main body part and extends along a radial direction of the through hole.

In some embodiments, there are a plurality of limiting parts, and the plurality of limiting parts are arranged at intervals along a circumferential direction of the main body part.

In some embodiments, the end cover further includes a guiding part communicated with the accommodating part, and the limiting part is configured to enter the accommodating part via the guiding part, or be detachable from the end cover via the guiding part.

In some embodiments, the cross section of the accommodating part is C-shaped or V-shaped.

In some embodiments, the accommodating part includes a first limiting wall, a second limiting wall arranged opposite to the first limiting wall, and a side wall which connects the first limiting wall and the second limiting wall.

In some embodiments, when the cover body rotates to the first position, the first limiting wall abuts against the limiting part to limit separation of the cover body from the end cover.

In some embodiments, at least one of the limiting part, the first limiting wall and the second limiting wall is provided with an inclined surface, and the inclined surface is configured to guide the limiting part to enter the accommodating part.

In some embodiments, the end cover includes a main body of end cover and an installation part, wherein the installation part is arranged on a surface of the main body of end cover, and is arranged to surround the through hole, and the accommodating part is arranged in the installation part or enclosed by the installation part and the main body of end cover.

In some embodiments, a first groove is arranged on a surface, far away from the shell, of the main body of end cover, and the installation part is fixed in the first groove.

In some embodiments, the accommodating part is formed on an inner side of the installation part, the cover body includes a main body part which covers at least part of the sealing element, and the main body part is arranged in an opening, which is formed in the installation part and surrounds the through hole, the opening is communicated with the accommodating part, and the limiting part is connected to an outer side of the main body part and extends along a radial direction of the through hole.

In some embodiments, the accommodating part is formed on the outer side of the installation part, the cover body includes a main body part which covers at least part of the sealing element, the main body part is sleeved outside the installation part, and the limiting part is connected to an inner side of the main body part and extends along a radial direction of the through hole.

In some embodiments, the end cover is provided with an opening which surrounds the through hole, and the opening is arranged on a side, far away from the shell, of the through hole, the accommodating part is formed on a side of the opening, the cover body includes a main body part which covers at least part of the sealing element, and the main body part is arranged in the opening, and the limiting part is connected to the outer side of the main body part and extends along a radial direction of the through hole.

In some embodiments, a stopping part is arranged in the accommodating part to limit maximum rotation stroke of the limiting part.

In some embodiments, a limiting structure is arranged between the limiting part and the accommodating part, and the limiting structure is configured to limit misplacement and separation between the cover body and the accommodating part when the cover body is arranged in the first position.

In some embodiments, the limiting structure includes:
- a limiting opening, arranged on one of the limiting part and the accommodating part; and
- a convex part, clamped with the limiting opening, and arranged on the other of the limiting part and the accommodating part.

In some embodiments, along an axial projection of the through hole, a maximum diameter of the sealing element is greater than a minimum diameter of the through hole.

In some embodiments, the sealing element includes a sealing column and a thrust table connected to one end of the sealing column, the thrust table is arranged radially, the sealing column is inserted into the through hole, and the thrust table abuts against the end cover.

In some embodiments, a rotation angle of the cover body from the first position to the second position is less than 180°.

In some embodiments, the cover body is in contact with the sealing element, a friction coefficient of a contact surface between the sealing element and the cover body is less than a friction coefficient of a contact surface between the sealing element and the end cover.

In some embodiments, in an axial direction of the through hole, a protruding part is arranged on a surface at which at least one of the cover body and the end cover is in contact with the sealing element, and the cover body abuts against the sealing element, such that the sealing element abuts against the protruding part.

According to a second aspect of the present disclosure, a housing assembly for a secondary battery is provided and includes:
    a housing, wherein a side of the housing is provided with a through hole for injection of electrolyte and an accommodating part, and the accommodating part is arranged on a side, far away from the inside of the housing, of the housing and is arranged along a circumferential direction of the through hole;
    a sealing element, sealing the through hole; and
    a cover body, covering at least part of the sealing element, wherein the cover body is rotatable and includes a limiting part;
    wherein when the cover body rotates to a first position, the limiting part is arranged in the accommodating part to limit separation of the cover body from the housing; when the cover body rotates to a second position, the limiting part and the accommodating part are misplaced along the circumferential direction of the through hole, to realize separation of the cover body and the housing.

According to a third aspect of the present disclosure, a secondary battery is provided, including: a shell and an end cover assembly in the above embodiments, wherein the end cover assembly covers an opening of the shell to form a housing assembly of the secondary battery; or
    the housing assembly in the above embodiments.

According to a fourth aspect of the present disclosure, a battery pack is provided, and the battery pack includes a plurality of secondary batteries in the above embodiments.

According to a fifth aspect of the present disclosure, a device using the battery is provided, and includes the secondary battery in the above embodiments, wherein the secondary battery is configured to provide electric energy.

According to a sixth aspect of the present disclosure, a liquid injection method of a secondary battery is provided, including:
    injecting electrolyte through a through hole on the housing of the secondary battery;
    placing an cover body on a housing, wherein the cover body covers at least part of a sealing element, the cover body is placed at a second position, and a limiting part of the cover body and an accommodating part on one side, far away from the inside of the housing, of the housing are misplaced along a circumferential direction of the through hole; and
    rotating the cover body from the second position to a first position, such that the limiting part enters the accommodating part to limit separation of the cover body from the housing.

In some embodiments, before the cover body is placed on the housing, the liquid injection method further includes:
    installing the sealing element on the housing or the cover body.

In some embodiments, the liquid injection method further includes:
    rotating the cover body from the first position to the second position, such that the limiting part and the accommodating part are misplaced along the circumferential direction of the through hole; and
    separating the cover body from the housing.

In some embodiments, after the cover body is separated from the housing, the liquid injection method further includes:
    removing the sealing element from the housing or the cover body.

According to a seventh aspect of the present disclosure, a liquid injection device for the secondary battery is provided and includes:
    a liquid injection device, configured to inject electrolyte into a housing through a through hole arranged on the housing; and
    a cover body disassembly and assembly mechanism, configured to rotate the cover body from a second position to a first position when a cover body is placed on the housing and is in the second position and when the cover body covers at least part of a sealing element, such that a limiting part on the cover body enters a accommodating part to limit separation of the cover body from the housing; wherein in the second position, the limiting part and the accommodating part are misplaced along a circumferential direction of the through hole.

In some embodiments, the liquid injection device further includes:
    a sealing element disassembly and assembly mechanism, configured to install the sealing element on the housing or the cover body, or remove the sealing element from the housing or the cover body.

In some embodiments, the cover body disassembly and assembly mechanism is configured to rotate the cover body from the first position to the second position, such that the limiting part and the accommodating part are misplaced along the circumferential direction of the through hole, to separate the cover body from the housing.

In some embodiments, a sealing element disassembly and assembly mechanism is configured to remove the sealing element from the housing or the cover body when the cover body is separated from the housing.

BRIEF DESCRIPTION OF THE DRAWINGS

Drawings illustrated herein are used for providing further understanding of the present disclosure and form part of the present disclosure, and illustrative embodiments of the present disclosure and description thereof are intended for explaining instead of improperly limiting the present disclosure. In the drawings:

FIG. 1-A is an outline schematic diagram of some embodiments of a vehicle adopting secondary batteries of the present disclosure;

FIG. 1-B is a structural schematic diagram of some embodiments of a battery pack of the present disclosure;

FIG. 1-C is a structural schematic diagram of some embodiments of a battery module of the present disclosure;

FIG. 1-D is an exploded view of some embodiments of a secondary battery of the present disclosure;

FIG. 2 is an exploded view of a first embodiment of an end cover assembly in a secondary battery of the present disclosure;

FIG. 3 is a sectional view of a first embodiment of an end cover assembly of the present disclosure;

FIG. 4A and FIG. 4B are respectively a top view and an A-A sectional view of some embodiments of a cover body in a first embodiment;

FIG. 5A and FIG. 5B are respectively structural schematic diagrams of a front side and a back side of some embodiments of an installation part in a first embodiment;

FIG. 6 is a front view of some embodiments of a sealing element in an end cover assembly of the present disclosure;

FIG. 7 is a structural schematic diagram of some other embodiments of a cover body in a first embodiment;

FIG. 8A, FIG. 8B and FIG. 8C are respectively a back side structural diagram, a bottom view and a B-B sectional view of some other embodiments of an installation part in a first embodiment;

FIG. 9 is a structural schematic diagram of a main body of end cover adapted to FIG. 8A;

FIG. 10A and FIG. 10B are sectional views of some embodiments showing that a cross section of an accommodating part is C-shaped;

Figure 10B:
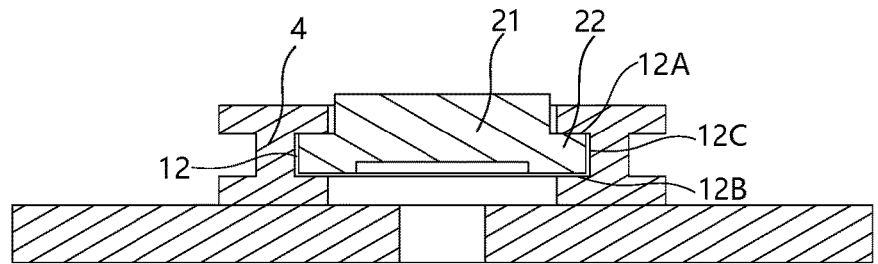

REFERENCE NUMERALS IN THE DRAWINGS 100, vehicle; 200, battery pack; 300, battery module; 400, secondary battery; 500, device for injecting electrolyte into a secondary battery;

10, end cover assembly; 10', end cover; 20, connector; 30, electrode assembly; 301, tab; 40, housing;

1, main body of end cover; 11, through hole; 12, accommodating part; 121, first convex part; 12A, first limiting wall; 12B, second limiting wall; 12C, side; 121, limiting opening; 122, stopping part; 123, inclined surface; 124, first concave part; 13, guiding part; 14, opening; 15, first groove; 151, second convex part; 16, third groove; 17, fourth groove; 18, installation hole; 19, vent hole;

2, cover body; 21, main body part; 211, clamping part; 211A, hole; 211B, polygonal groove; 211C, cross groove; 211D, boss; 212, second groove; 213, protruding part; 22, limiting part; 221, limiting opening; 222, limiting table; 223, third convex part; 23, extending part;

3, sealing element; 31, sealing column; 311, first chamfer; 312, transition part; 32, thrust table; 321, second chamfer; 33, sealing sheet; 34, sealing ring;

4, installation part; 41, installation ring; 41A, ring body; 41B, connecting part; 42, limiting table; 43, base; 44, second concave part;

5, terminal; 6, anti-explosion component; 7, sealing ring; 8, spacing sheet; 201, first shell; 202, second shell;

410, housing assembly; 410', housing;

501, liquid injection device; 502, cover body disassembly and assembly mechanism; 503, sealing element disassembly and assembly mechanism.

DETAILED DESCRIPTION

The present disclosure will be described in detail below. In the following paragraphs, different aspects of the embodiments are defined in more details. Each aspect defined in this way can be combined with any other one aspect or a plurality of aspects, unless explicitly stated that no combination is allowed. Especially, any characteristic deemed to be preferable or advantageous can be combined with any one or more characteristics which are deemed to be preferable or advantageous.

The terms "first" and "second" used in the present disclosure are merely used for convenience of description, to distinguish different components with the same name, rather than implying precedence or primary and secondary relationship.

In addition, when the element is called to be "on" the other element, the element can be directly arranged on the other element, or can be indirectly arranged on the other element, and one or more intermediate elements are inserted therebetween. In addition, when an element is called to "be connected to" the other element, the element can be directly connected to the other element, or can be indirectly connected to the other element, and one or more intermediate elements are inserted therebetween. In the following text, the same reference numeral represents the same element.

The "a plurality of" used in the present disclosure means more than two (including two), similarly, "a plurality of groups" refers to more than two groups (including two groups).

To clearly describe each orientation in the following embodiments, for example, each orientation of the battery is defined by the coordinate system in FIG. 1-D, x direction represents a length direction of the secondary battery 400; y direction is vertical to x direction in the horizontal plane, and represents a width direction of the secondary battery 400; z direction is vertical to the plane formed by x direction and y direction, and represents a height direction of the secondary battery 400. Based on such definition of orientations, the orientation or positional relationship indicated by such terms as "up", "down", "top", "bottom", "front", "rear", "inner" and "outer" are merely for the convenience of description of the present disclosure, rather than indicating or implying that the device referred to must be located in a certain orientation or must be constructed or operated in a certain orientation, therefore, the terms cannot be understood as a limitation to the protection scope of the present disclosure.

Many problems may lead to a shortened service life of the lithium-ion batteries, those skilled in the art have tried to solve the problem from many different angles over the years, however, no anticipated effect has been achieved.

As a part of the invention-creation process of the present disclosure, after numerous tests and verifications, the inventor found that one of the reasons leading to shortened service life of the battery is as follows: in the using process, the battery is subjected to charge and discharge cycles for a plurality of times, the electrolyte inside the battery will be inevitably subjected to irreversible reaction consumption, and the capacity of the battery will be decreased accordingly. Therefore, the inventor found that, if the electrolyte inside the battery can be supplemented in the using process of the battery, the degree by which the capacity of the battery decreases will be effectively slowed down, and the service life of the battery is prolonged.

The lithium-ion battery is mainly composed of positive electrode materials, negative electrode materials, electrolyte and a diaphragm, wherein the electrolyte is an ionic conductor which plays a role of conduction between the positive electrode and the negative electrode of the battery, and is generally composed of electrolyte lithium salt and organic solvent. To prevent extravasation of electrolyte in the using process which may pollute surrounding air and environment, or prevent entrance of water vapor or metal particles into the inside the battery which may cause short circuit of the positive electrode and the negative electrode, the battery proposes a high requirement on the sealing performance of the structure. In the related technology known to the inventor, infusion of electrolyte of a battery is generally performed in the production stage, after infusion of electrolyte is finished, to ensure airtightness of the battery, the liquid injection hole is generally closed through a laser welding manner.

As to this type of battery, liquid supplement is difficult in the using process, if liquid needs to be supplemented, the laser welding structure also needs to be destroyed, and resealing is difficult, moreover, the structure of the battery will be destroyed irreversibly, and the using performance of the battery is influenced.

In view of this, the present disclosure tends to provide a secondary battery which can realize repeated disassembly and assembly of the liquid injection component, to conveniently disassemble the liquid injection component to supplement liquid, and after liquid supplement is finished, the liquid injection hole can be closed reliably. However, in combination with the structural characteristics and performance requirements of the lithium-ion batteries, when the battery with dismountable liquid injection component is designed, numerous problems need to be solved simultaneously.

For example, 1, as compared with a lead-acid battery, the overall size of the lithium battery is small, correspondingly, the size of the liquid injection hole is also small, and the design of a dismountable structure is difficult; 2, the liquid injection component should be disassembled conveniently and rapidly, to facilitate operation and reduce maintenance time; 3, in the disassembly process of the liquid injection component, short circuit of the positive electrode and the negative electrode of the electrode assembly, caused when external impurities or metal scraps squeezed from the battery fall into the shell, should be prevented; and 4, when the battery is used in a vehicle, the vehicle will vibrate in an operating process, when the battery is used for a long time or the battery is disassembled and assembled for a plurality of times, since the size of the liquid injection component is small, the structural strength of the liquid injection component when the liquid injection component closes the liquid injection hole should be ensured, to ensure reliability and service life of the battery during operation.

On the basis of a comprehensive consideration of the above technical problems, the present disclosure provides an end cover assembly, a secondary battery, a battery pack and a device using the battery, to facilitate secondary liquid injection of the battery. That is, through reserving a liquid injection hole, the process of injecting electrolyte into the inside of the battery according to a required amount includes primary liquid injection and secondary liquid injection. Secondary liquid injection can further be called supplemented liquid injection and further liquid injection, etc. Secondary liquid injection means to supplement or replace electrolyte of the battery, or add or supplement any solid, liquid or gas to the battery. Through convenient secondary liquid injection, the present disclosure can effectively slow down the degree of decrease in the capacity of the cell, and prolong the service life of the battery.

The device using the battery includes a secondary battery 400 configured to provide electric energy for the device, as shown in FIG. 1-A, the device using the battery can be a vehicle 100, for example, a new energy vehicle, and the new energy vehicle can be a battery electric vehicle, a hybrid electric vehicle or an extended range vehicle, etc., or the device using the battery can also be an unmanned aerial vehicle or a ship, etc. The secondary battery 400 which can realize secondary liquid injection can enable the device to reduce the frequency of battery replacement, save cost, and improve reliability and power performance of the device during operation.

To enable the battery to have a higher power to satisfy use demands, as shown in FIG. 1-B, a battery pack 200 can be arranged in the device using the battery. In some embodiments, the battery pack 200 includes a first shell 201, a second shell 202 and a plurality of battery modules 300, wherein the first shell 201 is buckled with the second shell 202, and the plurality of battery modules 300 are distributed in a space enclosed by the first shell 201 and the second shell 202.

As shown in FIG. 1-C, the battery module 300 includes a plurality of secondary batteries 400, and the plurality of secondary batteries 400 can be connected in series, in parallel or in series and parallel to realize a large capacity or power. For example, as shown in FIG. 1-C, the secondary battery 400 can be placed vertically, the height direction of the secondary battery 400 is consistent with the vertical direction, and a plurality of secondary batteries 400 are arranged side by side along a width direction; or the secondary battery 400 can be placed horizontally, the width direction of the secondary battery 400 is consistent with the vertical direction, a plurality of secondary batteries 400 can be stacked for at least one layer along a width direction, and each layer includes a plurality of secondary batteries 400 arranged at intervals along a length direction.

To enable those skilled in the art to clearly understand improved points of the present disclosure, the overall structure of the secondary battery 400 is firstly illustrated.

As shown in FIG. 1-D, the secondary battery 400 includes a shell 40, an electrode assembly 30 and an end cover assembly 10, wherein the end cover assembly 10 includes an end cover 10', the end cover 10' is connected with the shell 40 to form a housing of the secondary battery 400, the electrode assembly 30 is arranged inside the shell 40, and the shell 40 is internally filled with electrolyte. The secondary battery 400 can be square, cylindrical or of other shapes.

According to actual use demands, a single or a plurality of electrode assemblies 30 can be arranged. As shown in FIG. 1-D, at least two electrode assemblies 30 which are wound independently can also be arranged inside the battery. The electrode assembly 30 can form a main body part through winding or stacking a first pole piece, a second pole piece and a diaphragm arranged between the first pole piece and the second pole piece, wherein the diaphragm is an insulator arranged between the first pole piece and the second pole piece. The main body part has two opposite end faces. In the present embodiment, the first pole piece being a positive pole piece and the second pole piece being a negative pole piece is taken as an example for illustration. A positive active substance is coated on a coating area of the positive pole piece, while a negative active substance is coated on the coating area of the negative pole piece. A plurality of uncoated areas extending from the coating area of the main body part are stacked to serve as a tab. The electrode assembly includes two tabs 301, that is, a positive tab and a negative tab. The positive tab extends from the coated area of the positive pole piece, while the negative tab extends from the coated area of the negative pole piece.

The end cover assembly 10 is arranged on the top of the electrode assembly 30, as shown in FIG. 1-D and FIG. 3, the end cover assembly 10 includes an end cover 10' and two terminals 5, the two terminals 5 are respectively a positive electrode terminal and a negative electrode terminal, each terminal 5 is correspondingly provided with an connector 20, and the connector 20 is arranged between the end cover 10' and the electrode assembly 30. As shown in FIG. 2, an installation hole 18 is arranged at the part, corresponding to the terminal 5, on the end cover 10', the terminal 5 is fixed in the installation hole 18, and a sealing ring 7 is arranged between the terminal 5 and the installation hole 18. For example, the tab 301 of the electrode assembly 30 in FIG. 1-D is arranged at the top part, the positive tab is connected with the positive terminal through one connector 20, and the negative tab is connected with the negative terminal through another connector 20. Optionally, the secondary battery 400 can include two terminal assemblies 10 which are respectively arranged at two ends of the shell 40, and each end cover assembly 10 is provided with a terminal 5.

The end cover 10' can further be provided with an anti-explosion component, and when too much gas exists inside the secondary battery 400, gas inside the secondary battery 400 is released timely, to avoid explosion. The end cover 10' is provided with a vent hole 19, the vent hole 19 can be arranged in the middle position, along the length direction, of the end cover 10', and the through hole 11 can be arranged between the installation hole 18 and the vent hole 19. The anti-explosion component includes an anti-explosion valve 6, and the anti-explosion valve 6 is arranged on the vent hole 19. Under a normal state, the anti-explosion valve 6 is installed in the vent hole 19 in a sealed manner, when the battery expands and air pressure inside the housing rises to exceed a preset value, the anti-explosion valve 6 is open, and gas is released outwards through the anti-explosion valve 6.

In some embodiments, as shown in FIG. 2, the end cover 10' is provided with a through hole 11 configured to inject electrolyte into the secondary battery 400, the through hole 11 can adopt a circular hole, an oval hole, a polygonal hole or a hole of other shapes, and can extend along a height direction of the end cover 10'. The end cover 10' is provided with a liquid injection component configured to close the through hole 11.

After the overall structure and the application of the secondary battery 400 are described, the liquid injection component of the present disclosure will be elaborated in detail below. Firstly the liquid injection component being arranged on the end cover 10' is taken as example, based on the structure, the present disclosure provides a plurality of embodiments, and the common points of each embodiment are firstly given below.

An object of the present disclosure is to provide a lithium-ion battery with improved performances. As to the end cover assembly of the embodiment of the present disclosure, separation of the cover body from the end cover can be realized through rotating the cover body, to realize secondary liquid injection. Through convenient secondary liquid injection, in the present disclosure, the degree of reduction in capacity of a cell can be effectively slowed down, and the service life of the battery can be prolonged.

Figure 27:
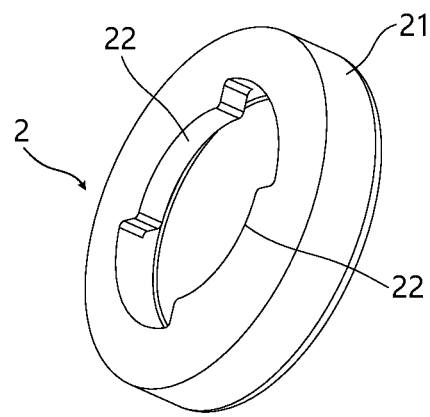
FIG. 27 is a structural schematic diagram of some embodiments of a cover body in a fifth embodiment.

As shown in FIG. 1-D to FIG. 27, the present disclosure provides an end cover assembly 10 for a secondary battery 400. In some embodiments, the end cover assembly 10 includes: an end cover 10', a sealing element 3 and a cover body 2.

The end cover 10' is provided with a through hole 11 for injection of electrolyte and an accommodating part 12, with the secondary battery 400 as a basis, the through hole 11 can be arranged along a height direction of the secondary battery 400, that is, arranged along a thickness direction of the end cover 10', or can be arranged in an inclined manner. The accommodating part 12 is arranged on a side, far away from the shell 40, of the end cover 10' and is arranged along a circumferential direction of the through hole 11, and the accommodating part 12 can be a cavity extending along the partial circumferential direction of the through hole 11. A preset distance exists between the accommodating part 12 and the surface, adjacent to the inside of the shell 40, of the end cover 10' and the size of the preset distance is not defined, for example, the accommodating part 12 can be arranged in the upper area, middle area or lower area of the end cover 10', such that at least part of the end cover 10' is arranged between the accommodating part 12 and the electrode assembly 30, rather than directly setting the accommodating part 12 on the bottom surface of the end cover 10'.

The sealing element 3 is configured to seal the through hole 11, and the cover body 2 is configured to cover at least part of the sealing element 3, to prevent separation of the sealing element 3 from the end cover 10'.

The cover body 2 can press the sealing element 3, such that the sealing element 3 can deform and improve the sealing effect, or the cover body 2 is only in contact with the sealing element 3 to limit the degree of freedom along a height direction; when the sealing element 3 is closely matched with the through hole 11 and can independently close the through hole 11, the cover body 2 and the sealing element 3 can also be arranged at intervals in the height direction. The cover body 2 can completely cover the sealing element 3, to exert a pressure onto the sealing element 3, limit the position or prevent external impurities from entering the battery; when the sealing element 3 is closely matched with the through hole 11 and can independently close the through hole 11, the cover body 2 can also partially cover the sealing element 3.

The cover body 2 is configured to be rotatable, for example, the cover body 2 can rotate within the plane vertical to the height direction, and the rotation axis can be an axis of the through hole 11. As shown in FIG. 4A, the cover body 2 includes a limiting part 22, and the limiting part 22 can extend along the partial circumferential direction of the through hole 11.

A clamping structure is formed between the limiting part 22 and the accommodating part 12, wherein when the cover body 2 rotates to a first position, part or all of the limiting part 22 is located inside the accommodating part 12 to limit separation of the cover body 2 from the end cover 10', to close the through hole 11; when the cover body 2 rotates to a second position along a clockwise direction or an anticlockwise direction, the limiting part 22 and the accommodating part 12 are misplaced along the circumferential direction of the through hole 11, and the limiting part 22 is completely separated from the accommodating part 12, to realize separation of the cover body 2 from the end cover 10', and under this state, electrolyte can be injected.

In the present disclosure, the cover body 2 can be separated from the end cover 10' through rotating the cover body 2, to realize secondary liquid injection. Through convenient secondary liquid injection, in the present disclosure, the degree of reduction in capacity of the secondary battery 400 can be effectively slowed down, and the service life of the battery can be prolonged. Further, after the liquid injection component is disassembled, the air inside and outside the shell 40 is communicated through the through hole 11, to discharge gas inside the shell 40 or bubbles between the pole pieces. Through discharging bubbles between the pole pieces, the gap between the pole pieces is shortened, thereby improving the cycling performance of the secondary battery 400, and further prolonging the service life of the secondary battery 400. Through discharging gas inside the shell of the secondary battery 400, in the present disclosure, pressure inside the shell 40 can be released, to reduce continuous pressure exerted by the gas inside the shell onto the anti-explosion valve 6, lower the risk of liquid leakage of the secondary battery 400 due to creep rupture of the anti-explosion valve 6 or the risk of shortened service life due to entrance of water vapor, to further prolong service life of the cell, meanwhile, the acting force exerted onto other structures due to expansion of the secondary battery 400 when the gas inside the secondary battery 400 is large can be reduced, thereby avoiding structural damage of other structures due to overlarge expansive force of the secondary battery 400, and prolonging service life of the battery pack. The cover body 2 is limited or separated from the accommodating part 12 through rotating, in the rotating process, the limiting part 22 may be in friction with the inner wall of the accommodating part 12, to produce metal particles. Since in the present disclosure, the accommodating part 12 is arranged on a side, far away from the shell 40, of the end cover 10', metal particles produced in the rotating process will not directly fall into the shell 40 and cause short circuit of the secondary battery 400, thereby further improving safety of the secondary battery 400.

An extending length of the limiting part 22 along the circumferential direction of the through hole 11 and an extending width along the radial direction of the through hole 11 ensure strength of the clamping structure. When disassembly and assembly are performed for a plurality of times, the clamping structure can also be prevented from damage. Moreover, when the secondary battery 400 is applied to the vehicle 100, since the vehicle 100 will vibrate in the operating process, in the present disclosure, through enhancing the clamping strength of the limiting part 22 and the accommodating part 12, damage caused when the limiting part 22 and the accommodating part 12 are vibrated for a long time can be prevented, thereby ensuring reliability and service life of the secondary battery 400 during operation.

In the present disclosure, the through hole 11 is opened and closed through rotation of the cover body 2, such that a detachable structure is formed between the cover body 2 and the end cover 10'. The liquid injection structure will not be damaged when the cover body 2 is opened, after secondary liquid injection is finished, the through hole 11 can also be closed reliably, to ensure operating reliability of the battery after secondary liquid injection. Therefore, the appearance of the secondary battery 400 is kept consistent with the appearance of the secondary battery 400 before liquid injection, and use after secondary liquid injection is not influenced. Further, the through hole 11 is closed through directly rotating the cover body 2, therefore, sealing of the through hole 11 can be realized with no need of laser welding, thereby reducing cleaning step on the through hole 11 before laser welding, and improving production efficiency of the battery.

In the present disclosure, the limiting part 22 is matched with or separated from the accommodating part 12 through rotation of the cover body 2, the structure is simple, the requirement on match precision is low, and repeated use is allowed; in the aspect of processing, the cover body 2 is provided with a limiting part 22, the end cover 10' is provided with an accommodating part 12 and they are both easy to process and are suitable for lithium-ion batteries with a small overall size; in the aspect of disassembly and maintenance, the disassembly and assembly of the cover body 2 are easy to operate, then the assembly efficiency of the battery can be improved during production, and the maintenance time can be shortened during secondary liquid injection.

FIG. 2 to FIG. 6 are structural schematic diagrams of an end cover assembly 10-1 of a first embodiment of the present disclosure. Wherein FIG. 3 shows a sectional view of a first embodiment of the present disclosure; FIG. 4A and FIG. 4B are respectively a top view and a sectional view of the cover body 2 in FIG. 3; and FIG. 5A and FIG. 5B are respectively structural schematic diagrams of a front side and a back side of an installation part 4 in FIG. 3.

As shown in FIG. 3 and FIGS. 4A and 4B, the cover body 2 further includes a main body part 21 configured to cover at least part of the sealing element 3, for example, the main body part 21 can be disk-shaped or ring-shaped, etc. The limiting part 22 is connected to the main body part 21 and extends along the radial direction of the through hole 11, according to the matching manner of the end cover 2 and the end cover 10', the limiting part 22 can extend inwards or outwards along the radial direction. For example, the limiting part 22 can be a boss which extends along a circumferential direction of the main body part 21, and the shape of the cross section of the boss is compatible with the accommodating part 12.

As shown in FIG. 4A and FIG. 4B, a plurality of limiting parts 22 are arranged, the plurality of limiting parts 22 are arranged at intervals along the circumferential direction of the main body part 21, correspondingly, a plurality of accommodating parts 12 are also available, and the plurality of limiting parts 22 and the plurality of accommodating parts 12 are set to be in one-to-one correspondence. Two limiting parts 22 are arranged in FIG. 4A and FIG. 4B, and the two limiting parts 22 are arranged oppositely relative to the center of the main body part 21.

In the present embodiment, through setting a plurality of limiting parts 22, the cover body 2 has a plurality of limiting supports in the first position, can be clamped stably by the accommodating part 12, and can reduce the clamping force exerted onto the limiting part 22, to ensure strength of the limiting part 22. For example, the plurality of limiting parts 22 can be distributed along the circumferential direction of the main body part 21, can realize more balanced distribution of pressure exerted onto the cover body 2 along the whole circumferential direction, and can prevent the cover body 2 from tilting, thereby being beneficial for smoothly rotating the cover body 2 from the first position to the second position during secondary liquid injection, and also preventing the limiting part 22 from scratching the sealing element 3 during rotation as to the structure, pressing the sealing element 3, of the cover body 2.

As shown in FIG. 5A and FIG. 5B, the end cover 10' further includes a guiding part 13 which is communicated with the accommodating part 12, and the limiting part 22 is configured to enter the accommodating part 12 through the guiding part 13, or to be separated from the end cover 10' through the guiding part 13, and the guiding part 13 forms a channel for the accommodating part 12 to be communicated with the outside of the end cover 10'. For example, a plurality of accommodating parts 12 are arranged along the circumferential direction, the guiding part 13 is an opening area formed between adjacent accommodating parts 12, when the cover body 2 is arranged in the second position, the limiting part 22 and the accommodating part 12 are misplaced circumferentially, and are arranged in the guiding part 13. Or only one accommodating part 12 is arranged along the circumferential direction, and the guiding part 13 is the opening area, except the accommodating part 12, on the circumferential direction.

A circumferential length of the guiding part 13 can be greater than that of the limiting part 22, and does not exceed the circumferential length of the accommodating part 12, to possibly increase the clamping length of the limiting part 22 and the accommodating part 12, and improve the limiting stability, and the circumferential length of the guiding part 13 should make the limiting part 22 smoothly enter the guiding part 13.

As shown in FIG. 3, the accommodating part 12 includes a first limiting wall 12A, a second limiting wall 12B arranged opposite to the first limiting wall 12A, and a side wall 12C configured to connect the first limiting wall 12A and the second limiting wall 12B.

As shown in FIG. 3, when the cover body 2 rotates to the first position, the first limiting wall 12A is abutted against the limiting part 22, the first limiting part 12A is a top wall, and can limit the degree of freedom of upward movement of the cover body 2 along a height direction, to limit separation of the cover body 2 from the end cover 10'. The second limiting wall 12B is a bottom wall, and a preset distance exists between the second limiting wall 12B and the surface, adjacent to the shell, of the end cover 10'. To reduce resistance during rotation of the cover body 2, a gap can exist between the second limiting wall 12B and the limiting part 22; optionally, the second limiting wall 12B can also be abutted against the limiting part 22. Similarly, to reduce resistance during rotation of the cover body 2, a gap can also exist between the side wall 12C and the limiting part 22; and optionally, the side 12C can also be in contact with the limiting part 22.

When the cover body 2 needs to be installed, a downward acting force is exerted onto the cover body 2, a gap can be formed between the limiting part 22 and the first limiting wall 12A through deformation of the sealing element 3, at this time, the cover body 2 is rotated to make the limiting part 22 smoothly enter the accommodating part 12, after the first position is reached, the cover body 2 is loosened, the cover body 2 moves upwards under the elastic effect of the sealing element 3, until the top surface of the limiting part 22 is abutted against the first limiting wall 12A, at this time, a gap may exist between the bottom surface of the limiting part 22 and the second limiting wall 12B.

When the cover body 2 needs to be disassembled, a downward acting force is exerted onto the cover body 2, a gap is formed between the limiting part 22 and the first limiting wall 12A through deformation of the sealing element 3, at this time, the cover body 2 is rotated, such that the limiting part 22 and the accommodating part 12 are smoothly misplaced circumferentially, and are arranged in the guiding part 13 as a whole. At this time, the second position is reached, and the cover body 2 is taken off for liquid injection.

As shown in FIG. 3, the accommodating part 12 extends along the circumferential direction of the through hole 11, and the cross section is C-shaped, C shape merely illustratively shows the shape of the accommodating part 12, and the first limiting wall 12A, the second limiting wall 12B and the side wall 12C can be planes or cambered surfaces. Such type of accommodating part 12 has a higher clamping strength when the accommodating part 12 is matched with the limiting part 22. Moreover, when the first limiting wall 12A is a plane and the top surface of the limiting part 22 is also a plane, an abutted area between the first limiting wall 12A and the limiting part 22 can be increased, the clamping stability is improved, frictional force between the first limiting wall 12A and the limiting part 22 can also be increased, and the difficulty of circumferential rotation of the cover body 2 under a clamping state relative to the end cover 10' is increased.

In some embodiments, a limiting structure is arranged between the limiting part 22 and the accommodating part 12, and is configured to limit misplacement and separation of the cover body 2 from the accommodating part 12 when the cover body 2 is in the first position. If the device using the secondary battery 400 produces great vibration or shock in the operating process, the limiting structure can make the limiting part 22 and the accommodating part 12 be reliably clamped in the first position, thereby preventing the limiting part 22 from circumferential rotation and separation from the accommodating part 12, making connection between the cover body 2 and the end cover 10' more reliable, improving sealing performance to the electrolyte, and ensuring reliability of the battery during operation.

As shown in FIG. 4A and FIG. 5B, the limiting structure includes: a limiting opening 221 and a first convex part 121. Wherein the limiting opening 221 is arranged on one of the limiting part 22 and the accommodating part 12, for example, the limiting opening 221 can be a hole or a groove, etc., the first convex part 121 is clamped with the limiting opening 221, and is arranged on the other of the limiting part 22 and the accommodating part 12. When the cover body 2 is arranged in the first position, under the elastic effect of the sealing element 3, the limiting opening 221 is tightly clamped with the first convex part 121, such that the limiting part 22 and the accommodating part 12 will not rotate and loosen due to such external forces as vibration and shock; or, the cover body 2 realizes clamping through interference fit between the limiting opening 221 and the first convex part 121.

As shown in FIG. 5B, the first convex part 121 is arranged on the first limiting wall 12A of the accommodating part 12, and the first convex part 121 is a cylinder; as shown in FIG. 4A, the top surface of the limiting part 22 is formed with a limiting opening 221, the limiting opening 221 is a circular hole, when the cover body 2 is in the first position, the cylinder is embedded into the circular hole, to limit rotation of the cover body 2.

As shown in FIG. 3, along an axial projection of the through hole 11, a largest diameter of the sealing element 3 is greater than a minimum diameter of the through hole 11. The structure can prevent the sealing element 3 from entering the shell 50 through the through hole 11 in the assembly or secondary liquid injection process.

As shown in FIG. 3 and FIG. 6, the sealing element 3 includes a sealing column 31 and a thrust table 32 connected to one end of the sealing column 31. The sealing column 31 is inserted into the through hole 11, for example, the sealing column 31 is closely matched with the through hole 11, to improve the sealing effect to the electrolyte. The thrust table 32 is arranged radially, and is abutted against the end cover 10'. To make the sealing column 31 be inserted into the through hole 11, a first chamfer 311 is arranged at the end, far away from the thrust table 32, of the sealing column 31. To well seal the connecting part between the sealing column 31 and the thrust table 32, a transition part 312 is arranged at a connecting part between the sealing column 31 and the thrust table 32, and the transition part 312 can be a fillet angle or an oblique angle.

The sealing element 3 can separately close the through hole 11, when secondary liquid injection is required, after the cover body 2 is disassembled, the through hole 11 is still closed by the sealing element 3, and finally electrolyte can be injected after the sealing element 3 is disassembled; when the cover body 2 is installed, the through hole 11 is firstly closed through the sealing element 3, and then the cover body 2 is installed. In this way, in the disassembly and assembly processes of the cover body 2, the through hole 11 is in a closed state, thereby further preventing short circuit of the positive electrode and the negative electrode of the electrode assembly 30 caused when metal scraps, produced from friction between the cover body 2 and the accommodating part 12 during rotation of the cover body 2, fall into the shell 50, and ensuring operating performance of the battery.

The sealing element 3 and the cover body 2 can be set to be of an integrated structure, but also can be set to be of a split structure.

As shown in FIG. 4A and FIG. 5B, when the cover body 2 rotates from the first position to the second position, a rotating angle is less than 180°. Through such a setting form, the cover body 2 can be clamped with the accommodating part 12 only by rotating for a small angle, thereby improving convenience and efficiency in assembly. Optionally, when the cover body 2 rotates from the first position to the second position, the rotating angle can also be greater than or equal to 180°.

As shown in FIG. 3, the cover body 2 is in contact with the sealing element 3, and a friction coefficient of the contact surface between the sealing element 3 and the cover body 2 is less than a friction coefficient of the contact surface between the sealing element 3 and the end cover 10'. In this way, when the cover body 2 is rotated, the rotational frictional force of the cover body 2 is small, the cover body 2 is easy to assemble, and the abrasion of the sealing element 3 can be reduced. To reduce frictional force between the sealing element 3 and the cover body 2, lubricating oil can be coated between the sealing element 3 and the cover body 2 or other manners of arranging other spacing pieces with a small frictional force can be set.

As shown in FIG. 3 and FIG. 4B, in the axial direction of the through hole 11, a protruding part 213 is arranged on the surface on which at least one of the cover body 2 and the end cover 10' is in contact with the sealing element 3, for example, the protruding part 213 can be of a ring structure or can be a plurality of protruding columns which are arranged at intervals. The cover body 2 abuts against the sealing element 3, such that the sealing element 3 abuts against the protruding part 213. Through enhancing the partial pressing force between the cover body 2 and the sealing element 3, the structure can prevent failed sealing caused by inconsistent compression amount at each part of the sealing element 3, thereby optimizing the sealing effect to the through hole 11, and preventing electrolyte from leaking outwards.

To facilitate rotation of the cover body 2, the main body part 21 of the cover body 2 is provided with a clamping part 211 which is configured to receive external operation to drive the cover body 2 to rotate. The clamping part 211 is set to facilitate rotation of the cover body 2 through the match between the tooling and the clamping part 211, exertion of an external force is facilitated during disassembly and assembly of the cover body 2, and the rotation angle of the cover body 2 is easy to control. The structural form which can be adopted by the clamping part 211 will be given below, and the following specific structures can be set separately or can be combined arbitrarily.

As shown in FIG. 4A, the clamping part 211 includes a plurality of holes 211A arranged on the main body part 21, and the plurality of holes 211A can be arranged at the position, adjacent to the periphery, of the main body part 21, for example, three holes 211A can be arranged.

As shown in FIG. 3, the end cover 10' includes a main body of end cover 1 and an installation part 4, the installation part 4 is arranged on the surface of the main body of end cover 1, and is set to surround the through hole 11, for example, the installation part 4 can be arranged on the surface, far away from the shell 50, of the end cover body 1, and the accommodating part 12 is arranged in the installation part 4, or the accommodating part 12 is enclosed by the installation part 4 and the main body of end cover 1.

In the present embodiment, the end cover 10' is designed to be of a split structure, since the main body of end cover 1 is of a thin plate structure which is complex and difficult to process, the installation part 4 is set to facilitate formation of the accommodating part 12, to lower processing difficulty of the main body of end cover 1.

As shown in FIG. 3, the accommodating part 12 is enclosed by the installation part 4 and the end cover body 1. As shown in FIG. 3 and FIG. 5B, the installation part 4 includes an installation ring 41 and a limiting table 42, the limiting table 42 is connected to the inner wall of the installation ring 41 and extends inwards along a radial direction, the installation ring 41 is fixed on the main body of end cover 1, an accommodating part 12 is formed between the limiting table 42 and the main body of end cover 1, and the bottom surface of the limiting table 42 serves as the first limiting wall 12A.

As shown in FIG. 3, a surface, far away from the shell 50, of the main body of end cover 1 is provided with a first groove 15, the installation part 4 is fixed in the first groove 15, the through hole 11 is arranged on the bottom wall of the first groove 15. The accommodating part 12 is formed on the inner side of the installation part 4.

Such type of structure can reduce the height of the installation part 4 relative to the main body of end cover 1, to reduce the height by which the liquid injection component protrudes out of the main body of end cover 1, to reduce the overall height of the battery, and simultaneously reduce possibility of collision between the liquid injection component and other parts in the installation or using process of the secondary battery 400, secondly, when the secondary battery 400 is applied to the battery pack, since the height of the installation part 4 is lowered, other components are easily installed above the end cover assembly 10, for example, a detection circuit configured to acquire signals of the secondary battery 400.

Specifically, the installation part 4 can be fixed in the first groove 15 through many manners. For example, close match, bonding, installation or welding of fasteners, etc. For the welding form, a side surface at which the installation part 4 is matched with the first groove 15 is a conical surface, the radial size of the opening end of the first groove 15 is greater than the radial size of the bottom of the first groove 15, and the matching surface between the installation part 4 and the first groove 15 is welded through laser.

In the structure, the side of the first groove 15 is designed to be a conical surface, which can play a guiding effect on placement of the installation part 4 into the first groove 15, and when laser welding is adopted, no gap exists in the incidence path of laser, and no explosion points will exist during welding due to gaps, thereby enhancing structural strength of welding.

As shown in FIG. 3, the accommodating part 12 is formed on the inner side of the installation part 4, the cover body 2 further includes a main body part 21 configured to cover at least part of the sealing element 3, and the main body part 21 is arranged in the opening 14 formed when the installation part 4 surrounds the through hole 11, the opening 14 is communicated with the accommodating part 12, and the limiting part 22 is connected to the outer side of the main body part 21 and extends along the radial direction of the through hole 11.

In the present embodiment, the cover body 2 is arranged in the opening 14, which is beneficial for reducing the height by which the liquid injection component protrudes out of the main body of end cover 1, then not only possibility of collision between the liquid injection component and other parts in the installation or using process of the secondary battery 400 can be lowered, in addition, when the secondary battery 400 is applied to the battery pack 200, other components are easily installed above the end cover assembly 10, for example, a detection circuit configured to acquire signals of the secondary battery 400.

Specifically, as shown in FIG. 5A and FIG. 5B, the installation part 4 includes an installation ring 41 and a limiting table 42, the limiting table 42 is connected to the inner wall of the installation ring 41, the limiting table 42 can be arranged at an end, far away from the through hole 11, of the installation ring 41, to reserve space for forming the accommodating part 12 on the height direction. The limiting table 42 is flush with the surface, far away from the through hole 11, of the installation ring 41, to increase the height of the accommodating part 12 to the greatest extent, correspondingly the thickness of the limiting part 22 can also be increased, to improve the clamping strength between the limiting part 22 and the accommodating part 12. Wherein the inner area enclosed by a plurality of limiting tables 42 in the installation part 4 forms an opening 14, the main body part 21 is arranged in the opening 14, and the opening 14 is communicated with the accommodating part 12.

Since the installation part 4 is arranged in the first groove 15, the bottom wall of the limiting table 42, the side wall of the installation ring 41 and the bottom wall of the first groove 15 enclose to form an accommodating part 12, therefore, the bottom wall of the limiting table 42 serves as a first limiting wall 12A, the bottom wall of the first groove 15 serves as a second limiting wall 12B, and the side wall of the installation ring 41 serves as a side wall 12C.

Wherein the limiting table 42 can extend inwards along a radial direction from the inner side of the installation ring 41, and the limiting table 42 extends along the circumferential direction. For example, a plurality of limiting tables 42 are arranged at intervals along the circumferential direction on the installation ring 41, and the plurality of limiting tables 42 can be distributed uniformly, a guiding part 13 is formed between adjacent limiting tables 42, and the guiding part 13 is communicated with the accommodating part 12. As shown in FIG. 4A and FIG. 5B, two limiting tables 42 are available, the limiting part 22 can rotate from the inside of the guiding part 13 to the center area along the circumferential direction of the limiting table 42 by only rotating for 90°, the center area along the circumferential direction of the limiting table 42 is taken as a first position, thereby being capable of reducing possibility of misplacement between the limiting part 22 and the accommodating part 12 under such external force as vibration and shock.

In some embodiments, at least one of the limiting part 22, the first limiting wall 12A and the second limiting wall 12B is provided with an inclined surface 123 which is configured to guide the limiting part 22 to enter the accommodating part 12. In this structure, through the setting of an inclined surface 123, the limiting part 22 can smoothly enter the accommodating part 12, no alignment is required to adjust the limiting part 22 to a designated height, thereby improving assembly efficiency, also preventing collision between the limiting part 22 and the opening of the accommodating part 12, prolonging the service life of the liquid injection component, and reducing the production of metal scraps.

Specifically, as shown in FIG. 4A, the limiting part 22 is provided with an inclined surface 123 which is configured to guide the limiting part 22 to enter the accommodating part 12. In this structure, through the setting of an inclined surface 123, the limiting part 22 can smoothly enter the accommodating part 12, no alignment adjustment is required, thereby improving assembly efficiency, also preventing collision between the limiting part 22 and the opening of the accommodating part 12, prolonging the service life of the liquid injection component, and reducing the production of metal scraps. Moreover, when the inclined surface 123 is arranged on the limiting part 22, processing is facilitated.

Specifically, the inclined surface 123 is arranged on a side, along the circumferential direction, of the limiting part 22, and the inclined surface 123 is configured to enable the thickness of the side, along the circumferential direction, of the limiting part 22, to be gradually decreased from the inside to the outside. The inclined surface 123 can be arranged at one side or two sides of the limiting part 22 along the circumferential direction. For example, the inclined surface 123 can be a plane or a cambered surface, etc.

As shown in FIG. 4A, a plurality of limiting parts 22 are connected at intervals onto the outer side of the main body part 21 along the circumferential direction, the plurality of limiting parts 22 can be arranged at intervals uniformly, and the limiting part 22 extends outwards along a radial direction from the outer side of the main body part 21. An inclined surface 123 is arranged on two side surfaces, along the circumferential direction, of the limiting part 22, such that the limiting part 22 enters the accommodating part 12 more smoothly.

As shown in FIG. 6, the sealing element 3 includes a sealing column 31 and a thrust table 32 connected to one end of the sealing column 31. The sealing column 31 is inserted into the through hole 11, the thrust table 32 is arranged along a radial direction, and is abutted against the end cover 10'. For example, the sealing element 3 adopts electrolyte-resistant high elastic materials, such as rubber or other plastic plastics, etc.

Through adopting the sealing element 3, when secondary liquid injection is required, after the cover body 2 is disassembled, the through hole 11 is still closed by the sealing element 3, and finally electrolyte can be injected when the sealing element 3 is disassembled; when the cover body 2 is installed, the through hole 11 is closed firstly through the sealing element 3, and then the cover body 2 is installed. In this way, in the disassembly and assembly processes of the cover body 2, the through hole 11 is in a closed state, thereby preventing short circuit of the positive electrode and the negative electrode of the electrode assembly 30 caused when metal scraps, produced from friction between the cover body 2 and the accommodating part 12 during rotation of the cover body 2, fall into the shell 50.

As shown in FIG. 3, a second groove 212 is arranged on the surface, adjacent to the through hole 11, of the main body part 21, and the thrust table 32 is arranged in the second groove 212. As shown in FIG. 4B, the bottom wall of the second groove 212 can further be provided with a protruding part 213, and the protruding part 213 can enhance partial pressing force of the cover body 2 onto the sealing element 3, thereby improving the sealing effect.

As shown in FIG. 3, when the cover body 2 is rotated, to reduce collision between the limiting part 22 and the accommodating part 12, a downward acting force can be exerted onto the cover body 2, such that the limiting part 22 has a reduced height and can enter the accommodating part 12 more smoothly, however, if the acting force is too large, the sealing element 3 will be crushed. The second groove 212 enables that the bottom surface of the cover body 2 is abutted against the end cover body 1 when the downward force is too large, the maximum amount of compression of the sealing element 3 is the height of the second groove 212, thereby avoiding too large exerted acting force, the amount of compression of the sealing element 3 exceeds the capacity of the sealing element 3 itself, and the sealing effect will be influenced if the sealing element 3 is crushed.

As shown in FIG. 3, the top surface of the installation part 4 does not exceed the top surface of the main body of end cover 1, for example, the two face are flush. Moreover, at least part of the sealing element 3 is arranged in the second groove 212, such that the top surface of the cover body 2 does not exceed the top surface of the installation part 4. Therefore, the liquid injection component will not be higher than the top surface of the main body of end cover 1.

Such a structure can reduce the overall height of the secondary battery 400, improve the energy density, and reduce the possibility of collision between the liquid injection component and other parts in the installation or using process of the secondary battery 400; when the secondary battery 400 is applied to the battery pack 200, other components can be easily installed above the end cover assembly 10, for example, the detection circuit configured to acquire signals of the secondary battery 400.

To make it easy for the limiting part 22 to enter the accommodating part 12 through rotation, the height of the accommodating part 12 is greater than the limiting part 22. After the limiting part 22 enters the accommodating part 12, under the effect of the elastic force of the sealing element 3, the top surface of the limiting part 22 will be in contact with the first limiting wall 12A, however, a gap exists between the bottom surface of the limiting part 22 and the second limiting wall 12B. Therefore, in order that the top surface of the cover body 2 does not exceed the top surface of the installation part 4, the height of the cover body 2 is smaller than the height of the installation part 4. Such a structure can not only enable the cover body 2 to be rotated smoothly, but also reserve a space for the installation of the sealing element 3 while reducing the overall height of the battery.

The assembly process of the secondary battery 400 at which the end cover assembly 10-1 is arranged is as follows: firstly, the installation part 4 is placed in the first groove 15, and is welded; then electrolyte is injected through the through hole 11, and the sealing element 3 is installed after liquid injection is finished; then the cover body 2 is placed on the end cover 10', and the cover body 2 covers at least part of the sealing element 3, wherein the cover body 2 is placed in the second position in which the limiting part 22 is misplaced with the accommodating part 12 in a circumferential direction; and finally, a special tool is used to clamp three holes 211A, an acting force is applied downwards such that a gap forms between the limiting part 22 and the first limiting wall 12A, rotation for 90° is performed such that the cover body 2 rotates from the second position to the first position, then the limiting part 22 enters the accommodating part 12, to restrict separation of the cover body 2 from the housing. After rotation is in place, the cover body 2 is released, under the elastic force of the sealing element 3, the cover body 2 enables the cover body 2 to be abutted against the first limiting wall 12A.

When secondary liquid injection needs to be performed on the secondary battery 400, a special tool is used to clamp the three holes 211A, the cover body 2 is rotated in a reversed direction, such that the cover body 2 reaches the second position from the first position, the cover body 2 is taken off, and the sealing element 3 is taken off, after electrolyte is injected, the assembly process is repeated, and maintenance of the battery is finished.

FIG. 7 is a deformation example of the cover body 2 in the end cover assembly 10-1. Different from FIG. 4A, in FIG. 7, the clamping part 211 includes a polygonal groove 211B arranged at the center area of the main body part 21, and can be a triangular, rectangular, pentagonal or hexagonal groove, etc.

FIGS. 8A, 8B and 8C and FIG. 9 are deformation embodiments of an installation part 4 of a first embodiment.

As shown in FIG. 8A to FIG. 8C, an inclined surface 123 is arranged on the first limiting wall 12A of the accommodating part 12, along the rotating direction at which the cover body 2 reaches the first position from the second position, the inclined surface 123 is constructed to have a gradually decreased distance with the second limiting wall 12B. The inclined surface 123 can be arranged on one end or two ends, along the circumferential direction, of the accommodating part 12, such that the limiting part 22 can smoothly enter the accommodating part 12. For example, the inclined surface 123 can be a plane or a cambered surface, etc. Optionally, the inclined surface 123 is arranged on the second limiting wall 12B of the accommodating part 12.

The accommodating part 12 is internally provided with a stopping part 122 which is configured to limit maximum rotation stroke of the limiting part 22. Each accommodating part 12 can be provided with a stopping part 122. The stopping part 122 can stop rotation of the limiting part 22, and prevent the limiting part 22 from directly rotating outwards from the accommodating part 12.

Under the state of reaching the maximum rotation stroke, a side face, along the circumferential direction, of the limiting part 22 is completely fit with the stopping part 122. For example, the main body part 21 is provided with two limiting parts 22 uniformly along the circumferential direction, and two side faces, along the circumferential direction, of the limiting part 22 are both in parallel with the central plane of the cover body 2, correspondingly, the stopping parts 122 of the two accommodating parts 12 are in central symmetry about the central plane of the through hole 11, and the two stopping parts 122 are in parallel with each other. Optionally, the side face, along the circumferential direction, of the limiting part 22 can also be partially abutted against the stopping part 122.

To prevent circumferential rotation of the installation part 4 during installation relative to the first groove 15, as shown in FIG. 8A to FIG. 8C, the bottom of the installation part 4 can be provided with a second concave part 44, for example, the second concave part 44 can be arranged on the bottom of the installation ring 41. Correspondingly, as shown in FIG. 9, a second convex part 151 is arranged at the position at which the bottom wall of the first groove 15 is connected with the side, and the second convex part 151 is matched with the second concave part 44, to limit circumferential rotation of the installation part 4 relative to the first groove 15.

Figure 10C:
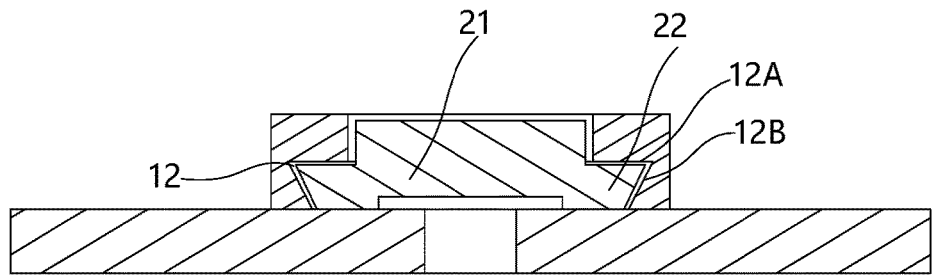
FIG. 10C is a sectional view of some embodiments showing that a cross section of an accommodating part is V-shaped.

FIGS. 10A to 10C are deformation embodiments of the shape of the accommodating part 12 in a first embodiment.

In some embodiments, as shown in FIG. 10A and FIG. 10B, the cross section of the accommodating part 12 is also C-shaped.

As shown in FIG. 10A, the inner wall of the accommodating part 12 is provided with a first concave part 124 which extends circumferentially, the limiting part 22 includes a limiting table 42 and a third convex part 223 which is arranged on the limiting table 42 and which extends along the circumferential direction, when the cover body 2 rotates to the first position, the third convex part 223 is abutted against the first concave part 124, to limit separation of the cover body 2 from the end cover 10'.

For example, the first concave part 124 can be arranged on at least one of the first limiting wall 12A, the second limiting wall 12B and the side 12C. As shown in FIG. 10A, the first concave part 124 is arranged on the first limiting wall 12A, correspondingly, the third convex part 223 is arranged on the top surface of the limiting table 42. In addition, the first concave part 124 is arranged on the second limiting wall 12B, and the third convex part 223 is arranged on the bottom surface of the limiting table 42; the first concave part 124 is arranged on the side 12C, and the third convex part 223 is arranged on the side face of the limiting table 42.

As shown in FIG. 10B, the accommodating part 12 is arranged on the installation part 4, the accommodating part 12 is arranged on the inner side of the installation part 4, and extends along the circumferential direction of the installation part 4. The cross section of the installation part 4 is I-shaped. The accommodating part 12 is arranged on the installation part 4, to reserve a sufficient space for the sealing element 3, thereby optimizing the sealing effect through increasing thickness of the sealing element 3, and prolonging service life of the sealing element 3.

In some other embodiments, as shown in FIG. 10C, the accommodating part 12 extends along the circumferential direction of the through hole 11, and the cross section is V-shaped, the orientation of the V-shaped opening is not limited, for example, the opening can be upwards, downwards, leftwards, rightwards or towards an inclined direction. Correspondingly, the cross section of the limiting part 22 can also be V-shaped.

The accommodating part 12 is provided with a first limiting wall 12A and a second limiting wall 12B with one of the sides being connected mutually, when the cover body 2 rotates to the first position, the first limiting wall 12A is abutted against the limiting part 22, and the first limiting wall 12A is arranged above the second limiting wall 12B. To reduce resistance during rotation of the cover body 2, a gap may exist between the second limiting wall 12B and the limiting part 22; optionally, the second limiting wall 12B can also be abutted against the limiting part 22. As shown in FIG. 10C, the first limiting wall 12A is arranged horizontally, and the second limiting wall 12A has a gradually increased radial direction from the bottom to the top.

FIG. 11 to FIG. 14B are structural schematic diagrams of an end cover assembly 10-2 of a second embodiment of the present disclosure, the end cover assembly 10-2 differs from the end cover assembly 10-1 mainly in the specific structure of the installation part 4.

Figure 12A:
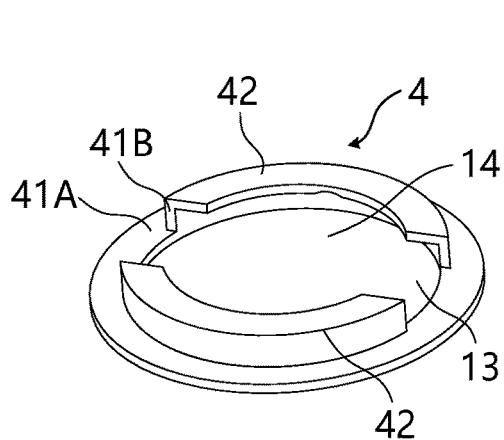
FIG. 12A and FIG. 12B are respectively structural schematic diagrams of a front side and a back side of some embodiments of an installation part in a second embodiment.

As shown in FIG. 12A, the installation ring 41 includes a ring body 41A and a connecting part 41B, the ring body 41A is installed in the first groove 15, the connecting part 41B is connected to the inner wall of the ring body 41A, and extends towards the direction far away from the main body of end cover 1 relative to the ring body 41A, for example, the connecting part 41B is set to be vertical or inclined relative to the ring body 41A, a plurality of connecting parts 41B can be arranged at intervals along the circumferential direction on the ring body 41A, and the plurality of connecting parts 41B can be arranged uniformly at intervals. The limiting table 42 is connected to one end, far away from the ring body 41A, of the connecting part 41B and extends inwards along a radial direction. An L-shaped structure is formed between the connecting part 41B and the limiting table 42, a guiding part 13 is formed between adjacent L-shaped structures, and the area enclosed by a plurality of limiting tables 42 forms an opening 14.

In the present embodiment, since adjacent connecting parts 41B are not closed, the cover body 2 is in the second position, such that the limiting part 22 is arranged in the guiding part 13, at this time, the limiting part 22 is exposed from the adjacent connecting part 41B, in the assembly and disassembly processes of the cover body 2, the alignment conditions between the limiting part 22 and the accommodating part 12 can be observed conveniently, such that the limiting part 22 can enter the accommodating part 12 more easily. Moreover, to make the cover body 2 rotate smoothly, a downward pressure also needs to be exerted onto the cover body 2 when the cover body 2 rotates, in this way, the resistance during rotation of the cover body 2 can be slightly increased, when the limiting part 22 enters into and exists from the accommodating part 12, such type of structure makes it easy for the operator to assist manually in toggling the cover body 2 to rotate, thereby improving convenience of operation.

Figure 12B:
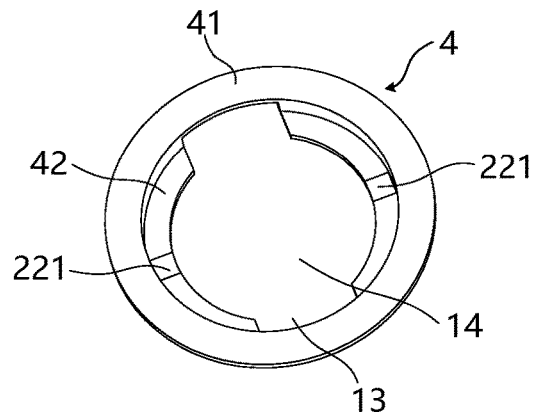
Figure 13:
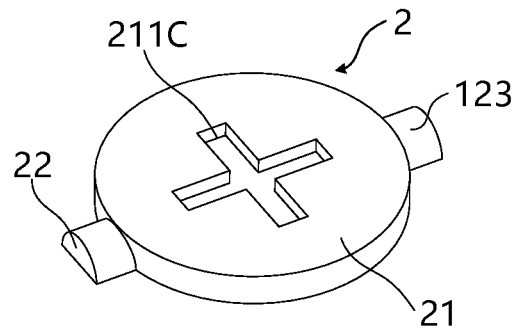
FIG. 13 is a structural schematic diagram of some embodiments of a cover body in a second embodiment.

As shown in FIG. 12A and FIG. 12B, the limiting opening 221 is arranged on the first limiting wall 12A of the accommodating part 12, and the limiting opening 221 is a cambered groove which extends along a radial direction of the cover body 2. As shown in FIG. 13, two sides, along the circumferential direction, of the limiting part 22 are both provided with a cambered inclined surface 123, and the two inclined surfaces 123 are tangent such that the top surface of the limiting part 22 forms an overall cambered surface, to serve as the first convex part 121. When the cover body 2 is in the first position, part of the top part of the limiting part 22 is embedded into the limiting opening 221, to limit rotation of the cover body 2. When the cover body 2 rotates along the clockwise or anticlockwise direction, the limiting part 22 can enter the accommodating part 12 more smoothly.

As shown in FIG. 13, the clamping part 211 is a cross groove 211C arranged in the central area of the main body part 21.

Figure 14A:
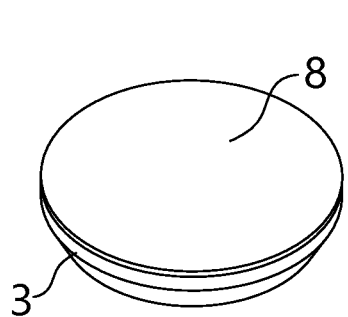
FIG. 14A and FIG. 14B are respectively a three-dimensional diagram and a sectional view of some embodiments in which a spacing sheet is arranged on the top of a sealing element.
Figure 14B:
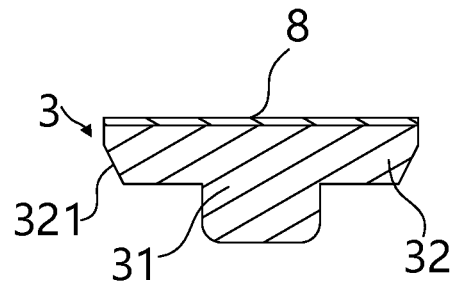
Figure 15:
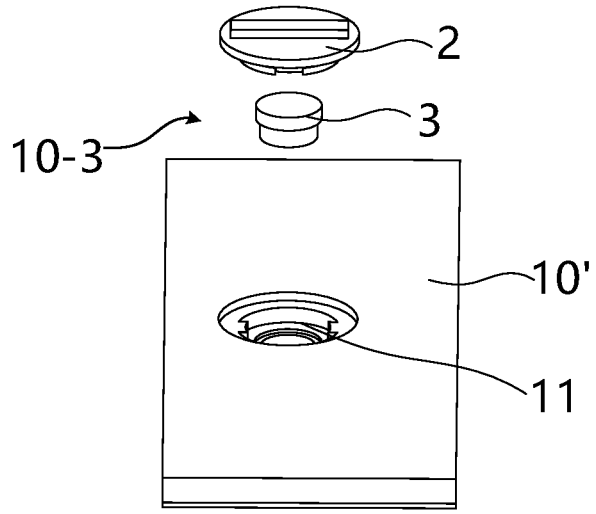
FIG. 15 is an exploded view of a third embodiment of an end cover assembly of the present disclosure.

As shown in FIG. 14A and FIG. 14B, the sealing element 3 includes a spacing sheet 8 which is arranged towards the surface of the cover body 2. The spacing sheet 8 covers at least part of the surface of the thrust table 32, for example, the spacing sheet 8 can adopt an aluminum sheet or tetrafluoro plastic sheet, etc. The spacing sheet 8 can be fixed onto the thrust table 32 through bonding or a fastener, and the friction coefficient of the contact surface between the spacing sheet 8 and the cover body 2 is smaller than the friction coefficient of the contact surface between the sealing element 3 and the end cover 10'. Or, the spacing sheet 8 can also be directly placed on the thrust table 32, and the friction coefficient of the contact surface between the spacing sheet 8 and the thrust table 32 is greater than the friction coefficient of the contact surface between the spacing sheet 8 and the cover body 2.

Figure 11:
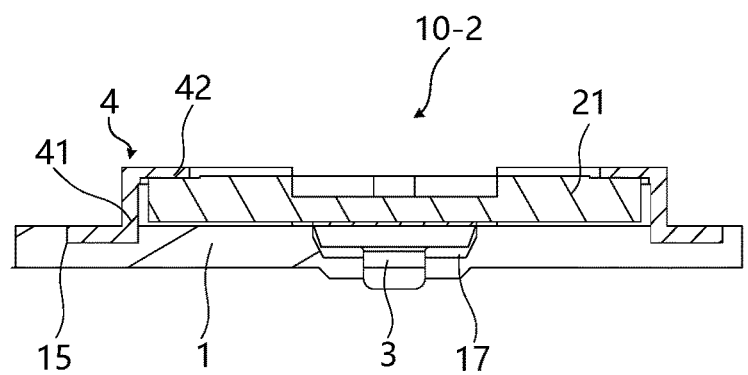
FIG. 11 is a sectional view of a second embodiment of an end cover assembly of the present disclosure.

As shown in FIG. 11, to save the installation space of the sealing element 3, the top of the main body of end cover 1 is provided with a fourth groove 17, and the thrust table 32 is arranged in the fourth groove 17. As shown in FIG. 14B, one end, adjacent to the sealing column 21, of the thrust table 32 is provided with a second chamfer 321, such that the thrust part 32 can enter the fourth groove 17 more smoothly when the sealing element 3 is installed.

FIG. 15 to FIG. 18B give structural schematic diagrams of the end cover assembly 10-3 of a third embodiment of the present disclosure. In the third embodiment, the cover body 2 is also arranged inside the opening 14, and the end cover assembly 10-3 differs from the end cover assemblies 10-1 and 10-2 in that an accommodating part 12 is directly formed on the end cover 10'.

Figure 16:
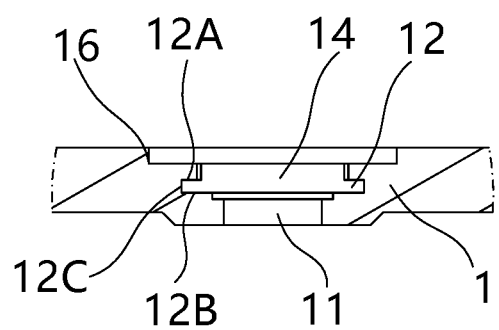
FIG. 16 is a sectional view of an end cover in a third embodiment of an end cover assembly of the present disclosure.

Specifically, as shown in FIG. 16, the end cover 10' is further provided with an opening 14 which surrounds the through hole 11, and the opening 14 is arranged on a side, far away from the shell 50, of the through hole 11, the accommodating part 12 is formed on the side of the opening 14, the cover body 2 further includes a main body part 21 which is configured to cover at least part of the sealing element 3, and the main body part 21 is arranged in the opening 14, and the limiting part 22 is connected to the outer side of the main body part 21 and extends along a radial direction of the through hole 11.

The accommodating part 12 of the present embodiment can be directly formed on the end cover 10', no installation part 4 needs to be set separately, thereby omitting the step of fixing the installation part 4 to the main body of end cover 1 of the above embodiment. In the long-term use process of the battery, the overall strength of the end cover 10' is higher, the position of the accommodating part 12 will not change, and the risk that the cover body 2 is separated from the accommodating part 12 in the using process of the secondary battery 400 can be lowered.

Figure 17:
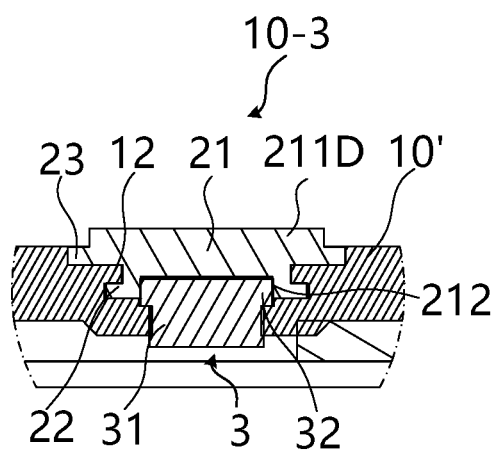
FIG. 17 is a sectional view of a third embodiment of an end cover assembly of the present disclosure.

As shown in FIG. 16, a third groove 16 is formed on the surface, far away from the shell 40, of the end cover 10', the third groove 16 is arranged above the accommodating part 12, and the radial size of the third groove 16 is greater than the radial size of the opening 14. Correspondingly, as shown in FIG. 17 and FIG. 18B, the cover body 2 further includes an extending part 23, the extending part 23 is connected to an end, far away from the limiting part 22, of the main body part 21, and extends along the whole circumferential direction of the main body part 21. The extending part 23 is matched with the third groove 16, to close the accommodating part 12, prevent external impurities from falling off between the cover body 2 and the end cover 10', and further improve reliability of the battery during operation.

Figure 18A:
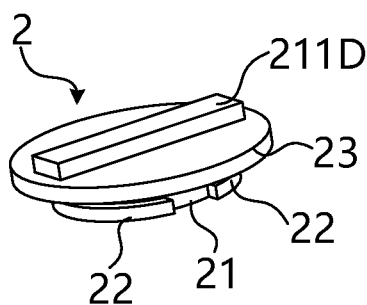
FIG. 18A and FIG. 18B are respectively structural schematic diagrams of a front side and a back side of a cover body in a third embodiment.
Figure 18B:
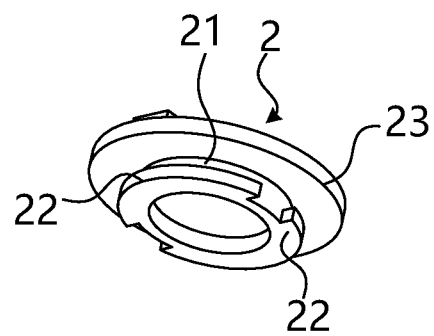

As shown in FIG. 18A, the clamping part 211 includes a boss 211D with the side being provided with a plane, and the boss 211D can be a long rectangle or a long circle, etc.

Figure 19:
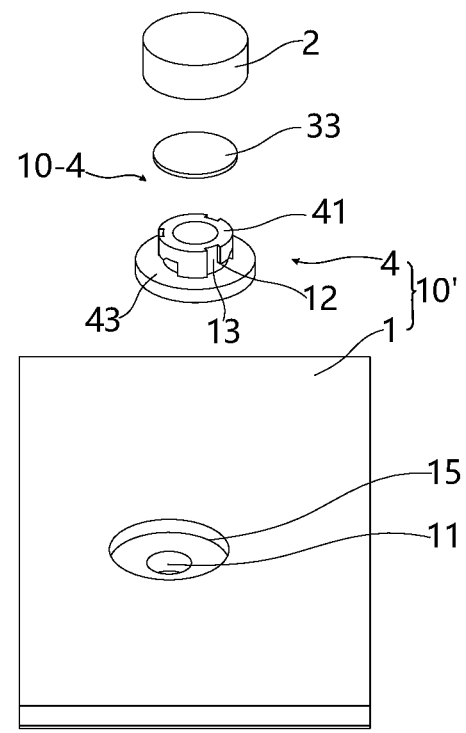
FIG. 19 is an exploded view of a fourth embodiment of an end cover assembly of the present disclosure.
Figure 20:
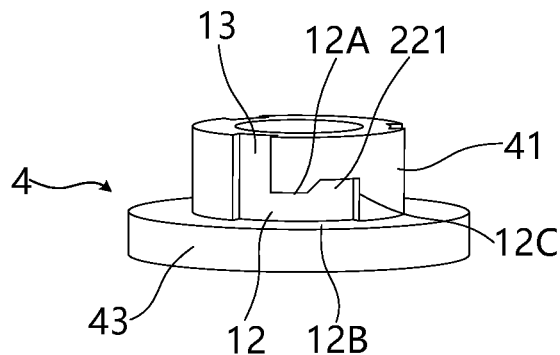
FIG. 20 is a structural schematic diagram of some embodiments of an installation part in a fourth embodiment.
Figure 21:
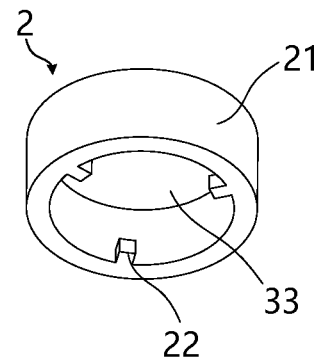
FIG. 21 is a structural schematic diagram of a cover body matched with the installation part shown in FIG. 20.

FIG. 19 to FIG. 21 give structural schematic diagrams of an end cover assembly 10-4 of a fourth embodiment. The fourth embodiment differs from the previous three embodiments in that, the accommodating part 12 is formed on the outer side of the installation part 4, the main body part 21 of the cover body 2 is sleeved outside the installation part 4, and the limiting part 22 is connected to the inner side of the main body part 21 and extends along the radial direction of the through hole 11.

In the present embodiment, the cover body 2 is sleeved outside the installation part 4, making it easy for the operator to directly exert an external force onto the cover body 2 to enable the cover body 2 to rotate, therefore, operation is easy, no special tooling needs to be designed, the assembly efficiency can be improved, and maintenance is convenient during secondary liquid injection. Moreover, since the cover body 2 is sleeved outside the installation part 4, the installation part 4 generally needs to protrude out of the surface of the end cover body 1, the accommodating part 12 is formed on the side of the installation part 4, thereby improving strength of the main body of end cover 1 on the one hand, and being beneficial for reducing thickness of the main body of end cover 1 on the other hand.

Specifically, as shown in FIG. 19 and FIG. 20, the installation part 4 includes an installation ring 41, the outer side of the installation ring 41 is formed with an accommodating part 12 which extends along the circumferential direction, for example, a plurality of accommodating parts 12 are arranged at intervals uniformly along the circumferential direction, the guiding part 13 is formed on the outer side of the accommodating part 12, and the first end of the guiding part 13 is communicated with the top part of the installation ring 41, the second end is communicated with the accommodating part 12, specifically, the second end of the guiding part 13 is communicated with the first end along the circumferential direction of the accommodating part 12. For example, the guiding part 13 can extend along an axial direction of the installation ring 41 or extend in an inclined manner, such that the guiding part 13 is connected with the installation ring 41 to form an L-shaped groove.

As shown in FIG. 19, the main body of end cover 1 is provided with a first groove 15, and the bottom wall of the first groove 15 is provided with a through hole 11. To improve installation stability of the installation part 4 in the first groove 15, the installation part 4 further includes a base 43, the base 43 is connected to the bottom of the installation ring 41, and the base 43 is arranged in the first groove 15, and the base 43 can be fixed with the first groove 15 through such manners as close match, bonding, welding or connection through fasteners. The top surface of the base 43 can be no higher than the first groove 15.

As shown in FIG. 20 and FIG. 21, the cover body 2 includes a main body part 21 and a limiting part 22, the main body part 21 is of a ring-shaped structure, the top of the ring-shaped structure can be closed, and can also be provided with an opening, the inner wall of the main body part 21 is provided with a plurality of limiting parts 22 at intervals along the circumferential direction, for example, three, the three limiting parts 22 can be arranged at intervals uniformly, the limiting part 22 is arranged on the inner side of the main body part 21, and extends inwards along the radial direction, the limiting part 22 can be arranged at the bottom of the main body part 21, correspondingly, the accommodating part 12 can also be arranged at the bottom of the installation part 41, for example, the top surface of the base 43 serves as the second limiting wall 12B. Such type of matching structure can reduce the height by which the cover body 2 protrudes out of the end cover body 1, to reduce overall height of the battery.

As shown in FIG. 20 and FIG. 21, a limiting opening 221 is arranged on the first limiting wall 12A of the accommodating part 12, and the limiting opening 221 is concave inwards relative to the first limiting wall 12A. The limiting part 22 serves as the first convex part 121, and is configured to be embedded into the limiting opening 221 when the cover body 2 is in the first position. The limiting opening 221 is arranged at the first limiting wall 12A of the accommodating part 12, and the limiting opening 221 is concave inwards relative to the first limiting wall 12A; and a plurality of accommodating parts 12 can be arranged at intervals along the circumferential direction of the through hole 11 and are independent, and the limiting opening 221 is arranged on the end, far away from the guiding part 13 along the circumferential direction, of the accommodating part 12.

As shown in FIG. 20, a plurality of accommodating parts 12 are arranged at intervals along the circumferential direction of the through hole 11, and the limiting opening 221 is arranged at the end, far away from the guiding part 13, of the accommodating part 12.

As shown in FIG. 21, the sealing element 3 includes a sealing sheet 33, and the sealing sheet 33 can be attached onto the inner bottom surface of the cover body 2.

The assembly process of the secondary battery 400 at which the end cover assembly 10-4 is arranged is as follows: firstly, the installation part 4 is placed in the first groove 15 and is welded; then, electrolyte is injected into the through hole 11; then, the sealing sheet 33 is attached to the inner bottom part of the cover body 2; and finally, the cover body 2 is sleeved outside the installation part 4. In the sleeving process, the limiting part 22 enters through the guiding part 13, and when the limiting part 22 reaches the accommodating part 12, a downward acting force is exerted onto the cover body 2, and the cover body 2 is rotated such that the limiting part 22 moves inside the accommodating part 12. After the limiting part 22 reaches the limiting opening 221, the cover body 2 is released, and the cover body 2 is abutted against the top wall of the limiting opening 221 under the effect of an elastic force of the sealing element 3 to limit circumferential rotation of the cover body 2, since then assembly is finished.

When secondary liquid injection needs to be performed on the secondary battery 400, the cover body 2 is rotated in a reversed direction, such that the cover body 2 reaches the second position from the first position. The cover body 2 is taken off together with the sealing element 3, and after electrolyte is injected, the assembly process is repeated, then maintenance of the battery is finished.

The top cover assembly 10-4 is suitable for a structure with a small circumferential width of the limiting part 22, and a plurality of accommodating parts 12 can be designed to be of independent forms. As to the structure with a large circumferential width of the limiting part 22, a plurality of accommodating parts 12 can be cut-through along the whole circumferential direction of the installation ring 41, and the second end of the guiding part 13 is communicated with the cut-through area of the adjacent accommodating part 12. As to the structure, a limiting opening 221 can also be arranged on the first limiting wall 12A, the limiting opening 221 is arranged between adjacent guiding parts 13, and the limiting opening 221 is concave inwards relative to the first limiting wall 12A, such that the limiting part 22 is matched with the limiting opening 221 when the cover body 2 is arranged in the first position. Such a structure can lower processing difficulty, and since the circumferential width of the limiting part 22 is increased, the clamping strength between the limiting part 22 and the accommodating part 12 can be increased.

Figure 22:
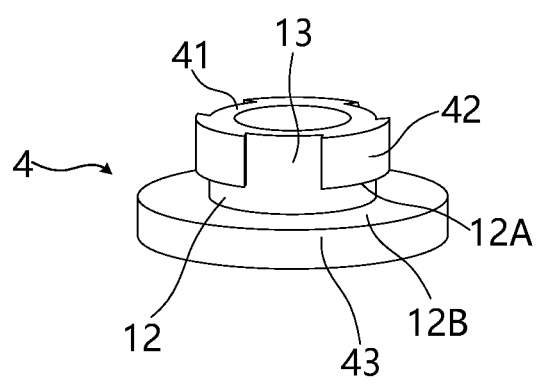
FIG. 22 is a structural schematic diagram of some other embodiments of an installation part of a fourth embodiment.
Figure 23:
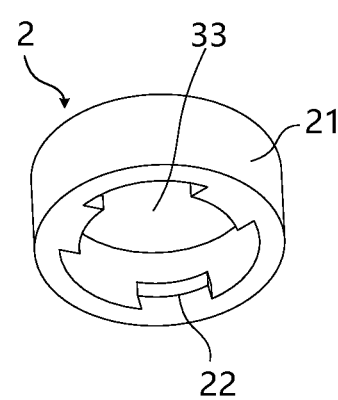
FIG. 23 is a structural schematic diagram of a cover body matched with the installation part shown in FIG. 22.
Figure 24:
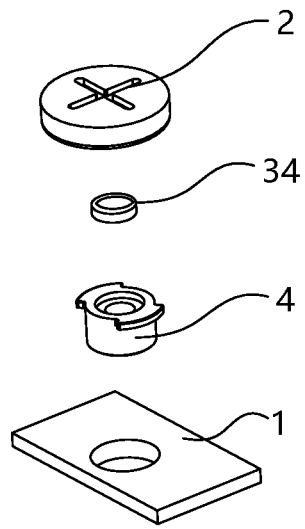
FIG. 24 is an exploded view of a fifth embodiment of an end cover assembly of the present disclosure.
Figure 25:
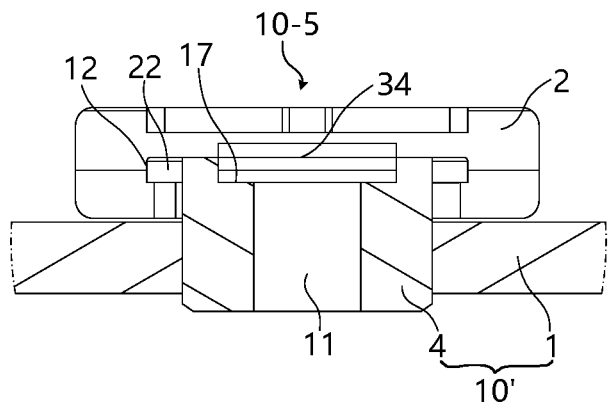
FIG. 25 is a sectional view of a fifth embodiment of an end cover assembly of the present disclosure.
Figure 26:
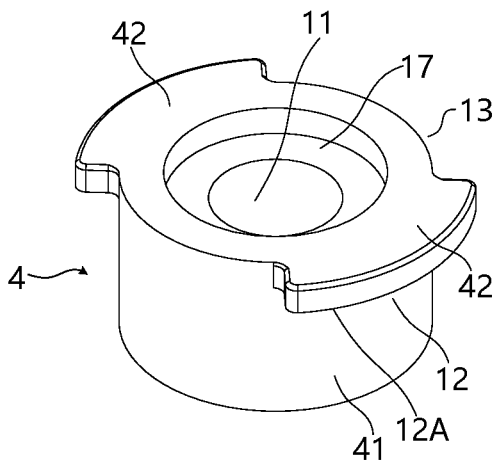
FIG. 26 is a structural schematic diagram of some embodiments of an installation part in a fifth embodiment.

FIG. 22 is a deformation embodiment of the accommodating part 12 in a fourth embodiment. FIG. 22 differs from FIG. 20 in that, a plurality of accommodating parts 12 are arranged at intervals along the circumferential direction of the through hole 11 and are cut-through in the circumferential direction, and the guiding part 13 is communicated with the cut-through area of the adjacent accommodating part 12. In FIG. 22, a limiting opening 221 can also be arranged on the first limiting wall 12A of the accommodating part 12, and the limiting opening 221 is concave inwards relative to the first limiting wall 12A. As shown in FIG. 21, the limiting part 22 serves as the first convex part 121 and is configured to embed into the limiting opening 221 when the cover body 2 is arranged in the first position. As shown in FIG. 22, the accommodating part 12 extends along the whole circumferential direction of the through hole 11, and the limiting opening 221 is arranged between adjacent guiding parts 13.

FIG. 24 to FIG. 27 show structural schematic diagrams of an end cover assembly 10-5 of a fifth embodiment. The end cover assembly 10-5 differs from the end cover assembly 10-4 of the fourth embodiment in the forming manner of the accommodating part 12. The installation part 4 includes an installation ring 41 and a limiting table 42, the outer side of the installation ring 41 is provided with a plurality of limiting tables 42 at intervals along the circumferential direction, the limiting table 42 extends outwards along the radial direction, for example, a plurality of accommodating parts 12 are arranged at intervals uniformly along the circumferential direction, for example, two or three accommodating parts 12 can be available, the main body of end cover 1 can be provided with an installation hole, the installation ring 41 is inserted into the installation hole for fixation, and the inner hole of the installation ring 41 forms a through hole 11. The limiting table 42 and the main body of end cover 1 together form an accommodating part 12, the bottom wall of the limiting table 42 serves as a first limiting wall 12A, the top surface of the main body of end cover 1 serves as the second limiting wall 12B, and the outer side of the installation ring 41 serves as the side 12C.

The cover body 2 includes a ring-shaped main body part 21 and a limiting part 22, the top part of the main body part 21 can be closed or can be provided with an opening, the limiting part 22 is arranged on the inner side of the main body part 21 and extends inwards along the radial direction, the limiting part 22 can be arranged at the bottom of the main body part 21, to reduce the height of the cover body 2 relative to the main body part 1, and a preset interval is formed between the limiting part 22 and the inner bottom surface of the cover body 2.

The sealing element 3 can adopt a sing ring 34, or adopt a sealing sheet 33 or a sealing nail. To save installation space of the sealing element 3, the top of the installation part 4 is provided with a fourth groove 17, and the sealing element 3 is arranged in the fourth groove 17.

In the present embodiment, after assembly or secondary liquid injection, the cover body 2 is sleeved outside the installation part 4. In the sleeving process, the limiting part 22 enters through the guiding part 13. After the limiting part 22 reaches the accommodating part 12, a downward acting force is exerted onto the cover body 2, and the cover body 2 is rotated to enable the limiting part 22 to move inside the accommodating part 12. After the limiting part 22 reaches the limiting opening 221, the cover body 2 is released, the cover body 2 is abutted against the top wall of the limiting opening 221 under the effect of an elastic force of the sealing element 3 to limit rotation of the cover body 2 along the circumferential direction, since then the assembly is finished.

When secondary liquid injection needs to be performed on the secondary battery 400, the cover body 2 is rotated in a reversed direction, such that the cover body 2 reaches the second position from the first position. The cover body 2 is taken off together with the sealing element 3, and after electrolyte is injected, the assembly process is repeated, then maintenance of the battery is finished.

Figure 28:
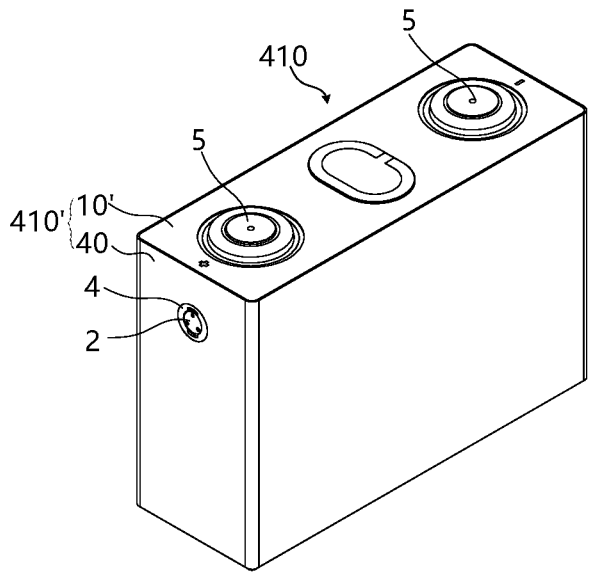
FIG. 28 is a structural schematic diagram of some embodiments of a housing assembly for a secondary battery of the present disclosure.

Secondly, based on the improvement of the end cover assembly 10 in the above embodiment, the present disclosure further provides a housing assembly 410 for a secondary battery, in some embodiments, as shown in FIG. 28, the housing assembly 410 includes: a housing 410', a sealing element 3 and a cover body 2. The housing 410' includes a shell 40 and an end cover 10' connected with the shell 40, and the end cover 10' closes the opening end of the shell 40. The side of the housing 410' is provided with a through hole 11 for injection of electrolyte and an accommodating part 12, the accommodating part 12 is arranged on a side, far away from the shell 410', of the housing 410' and is arranged along the circumferential direction of the through hole 11; and the sealing element 3 is configured to seal the through hole 11.

The cover body 2 is configured to cover at least part of the sealing element 3, the cover body 2 is configured to be rotatable, and includes a limiting part 22. Wherein when the cover body 2 rotates to the first position, the limiting part 22 is located inside the accommodating part 12 to limit separation of the cover body 2 from the housing 410'; when the cover body 2 rotates to the second position, the limiting part 22 and the accommodating part 12 are misplaced along the circumferential direction of the through hole 11, to realize separation of the cover body 2 from the housing 410'.

In the present embodiment, the through hole 11 can be arranged on any wall surface of the housing 410', for example, the through hole 11 can be arranged on the end cover 10', or arranged on the wall surface, except the end cover 10', on the housing 410', such that the setting position of the through hole 11 can be more flexible. As shown in FIG. 1-D, since the size of the lithium battery is small, and the end cover 10' is provided with a terminal 5 and an anti-explosion component 6 installed on the vent hole 19, or an end cover temperature collection structure will also be set in some other structures, the remaining area on the end cover assembly 10 is small. If the through hole 11 is arranged on the other surfaces of the housing 410', then the size of the liquid injection component is allowed to be increased, to further enhance structural strength, the reliability in closing electrolyte is improved in a vibrating operating environment, and a big operating space is available when the liquid injection component is disassembled and assembled.

As shown in FIG. 28, the through hole 11 is arranged on the wall surface, adjacent to the end cover 10', on the housing 410', such that the secondary battery 400 can be stably placed with the end cover 10' being upwards. For example, the through hole 11 is arranged on the wall surface, adjacent to the largest side surface, on the housing 410', in this way, when the plurality of secondary batteries 400 are placed horizontally or vertically to form a battery module 300, the contact of the maximum side faces of adjacent secondary batteries 400 can still be kept, such that the structure of the battery module 300 is more stable, and the size can be reduced. The liquid injection component in FIG. 28 can select any embodiment described in the part of the cover body assembly 10.

The housing assembly 410 of the present embodiment can flexibly and conveniently realize repeated disassembly and assembly of the liquid injection component, such that when the electrolyte is not sufficient or the performance of the electrolyte is lowered, the liquid injection component can be conveniently disassembled for secondary liquid injection, and gas in the battery is discharged, after secondary liquid injection is finished, the liquid injection hole can also be closed reliably, to ensure operating reliability of the battery after secondary liquid injection, and enable the appearance of the battery to be consistent with the appearance before liquid injection.

For the embodiments in which a liquid injection component is arranged on other faces of the shell, please refer to each above embodiment in which the end cover 10' is provided with a liquid injection component, which will not be repeated redundantly herein.

Figure 29:
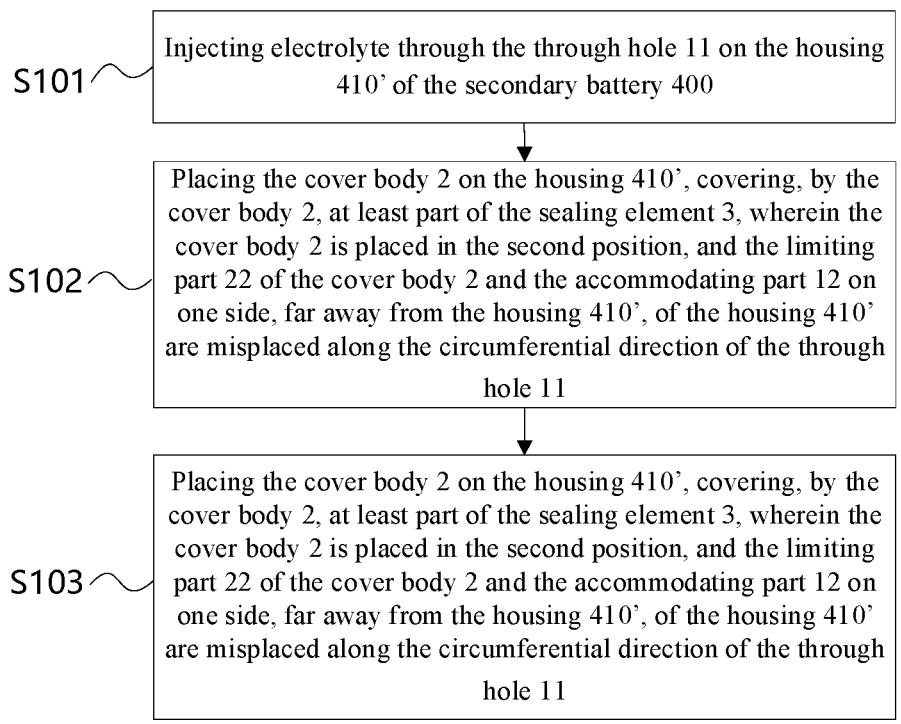
FIG. 29 is a flow diagram of some embodiments of a liquid injection method of a secondary battery of the present disclosure.

Secondly, the present disclosure further provides a liquid injection method of the secondary battery 400, based on the secondary battery 400 of the above embodiments, in some embodiments, as shown in the flow diagram of FIG. 29, the liquid injection method includes:

Step S101, injecting electrolyte through the through hole 11 on the housing 410' of the secondary battery 400;

Step S102, placing the cover body 2 on the housing 410', covering, by the cover body 2, at least part of the sealing element 3, wherein the cover body 2 is placed in the second position, and the limiting part 22 of the cover body 2 and the accommodating part 12 on one side, far away from the inside of the housing 410', of the housing are misplaced along the circumferential direction of the through hole 11; and Step S103, rotating the cover body 2 from the second position to the first position, such that the limiting part 22 enters the accommodating part 12, to limit separation of the cover body 2 from the housing 410'.

Compared with the traditional manner in which the liquid injection hole is closed through laser welding, in the present disclosure, not only the welding process is avoided, but also a plurality of processes of subsequent cleaning of welding slags and drying of liquid residual from cleaning caused by welding are avoided. Therefore, in the present disclosure, the production efficiency of the battery is improved. In the present disclosure, the match between the limiting part 22 and the accommodating part 12 is realized through rotation of the cover body 2, the assembly is simple and rapid, in the assembly process of the battery, the assembly efficiency of the liquid injection component can be improved, thereby further improving production efficiency of the battery.

Figure 30:
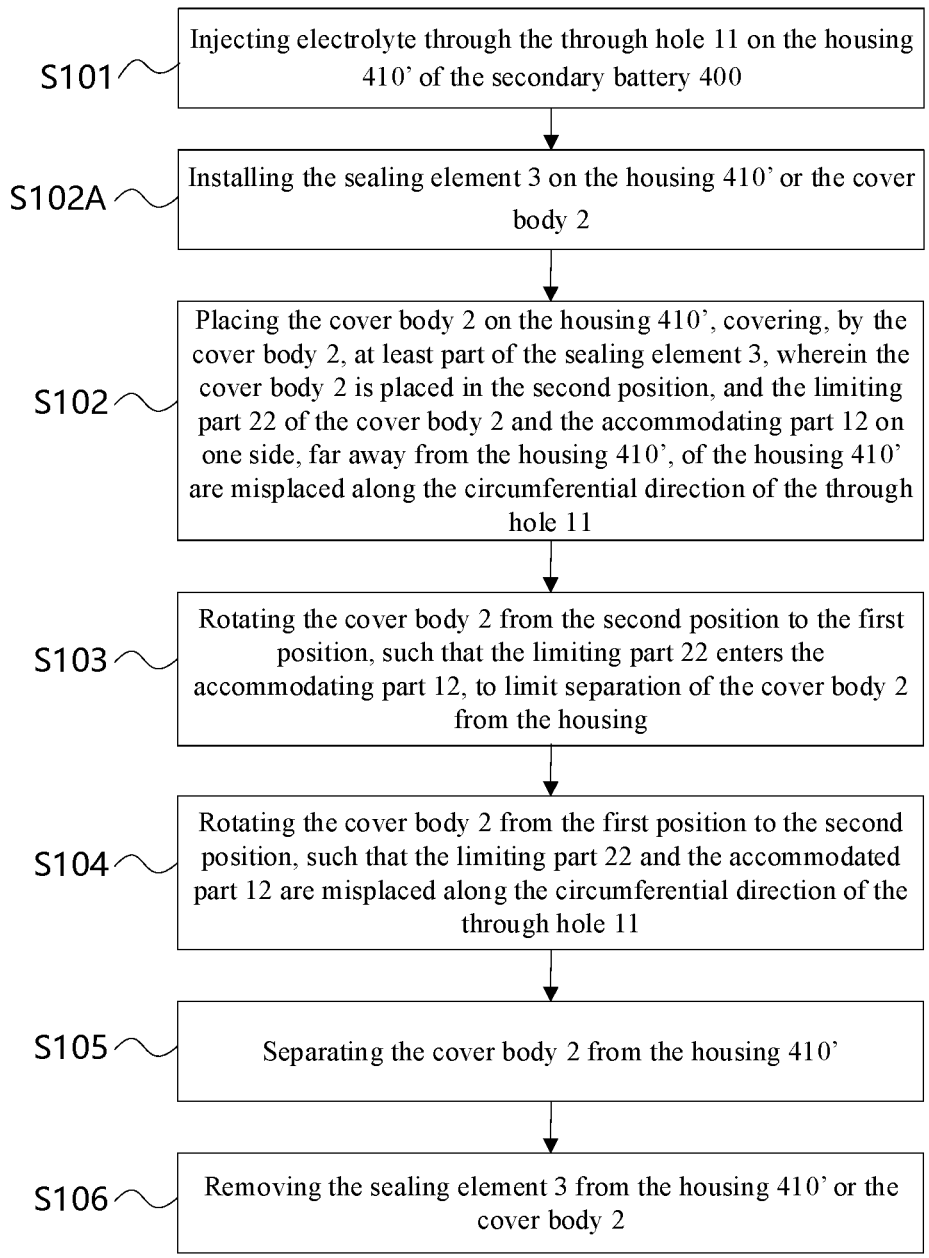
FIG. 30 is a flow diagram of some other embodiments of a liquid injection method of a secondary battery of the present disclosure.

Further, as shown in FIG. 30, before the cover body 2 is placed on the housing 410' in step 102, the liquid injection method further includes:

Step S102A, installing the sealing element 3 on the housing 410' or the cover body 2.

In the present embodiment, the sealing element 3 is installed on the housing 410' or the cover body 2, the sealing element 3 can be directly covered after the cover body 2 is installed, or a pressing force can be produced to the sealing element 3, to play a better sealing effect on the through hole 11. For example, for the end cover assemblies 10-1, 10-2, 10-3 and 10-5, the sealing element 3 can be installed on the end cover 10'; as to the end cover assembly 10-4, the sealing element 3 includes a sealing sheet 33, the cover body 2 is of a cap cover structure, and the sealing sheet 33 is attached onto the inner bottom surface of the cover body 2 in advance.

In some other embodiments, as shown in FIG. 30, the liquid injection method of the present disclosure further includes:

Step S104, rotating the cover body 2 from the first position to the second position, such that the limiting part 22 and the accommodated part 12 are misplaced along the circumferential direction of the through hole 11; and Step S105, separating the cover body 2 from the housing 410', to further inject electrolyte.

In the traditional manner of closing the liquid injection hole through laser welding, secondary liquid injection of the battery is not allowed. In the present disclosure, disassembly of the cover body 2 can be realized flexibly and conveniently through steps S104-S105, such that when the electrolyte is not sufficient or the performance of the electrolyte is lowered, the liquid injection component can be conveniently disassembled for secondary liquid injection, and gas in the battery is discharged. After liquid injection is finished, the installation of the cover body 2 is finished through steps S101-S103, to close the through hole 11. The service life of the battery is improved through secondary liquid injection.

Through the liquid injection method, repeated disassembly and assembly of the liquid injection component can be realized flexibly and conveniently, after secondary liquid injection is finished, the liquid injection hole can be closed reliably, to ensure operating reliability of the battery after secondary liquid injection, and enable the appearance of the battery to be kept consistent with the appearance before liquid injection; moreover, the maintenance time can be shortened during secondary liquid injection, and liquid can be supplemented timely when the performance of the battery is lowered, to ensure operating performance of the battery.

Further, as shown in FIG. 30, after the cover body 2 is separated from the housing in step S105, the liquid injection method further includes: step S106, removing the sealing element 3 from the housing 410' or the cover body 2.

In the present embodiment, after the sealing element 3 is removed from the housing 410' or the cover body 2, electrolyte inside the housing 410' can be poured out conveniently, to prevent the electrolyte from flowing onto the sealing element 3, enable the sealing element 3 to keep clean, and prolong the service life.

Figure 31:
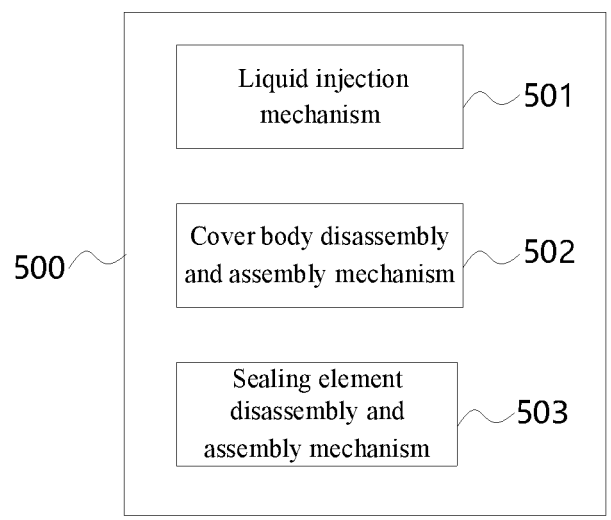
FIG. 31 is schematic diagram of components of some embodiments of a device for injecting electrolyte into a secondary battery of the present disclosure.

Finally, the present disclosure further provides a liquid injection device 500 configured to inject liquid into the secondary battery 400, to realize the above liquid injection method. As shown in FIG. 31, in some embodiments, the liquid injection device 500 includes: a liquid injection device 501 configured to inject electrolyte into the housing through the through hole 11 arranged on the housing 410'; and a cover body disassembly and assembly mechanism 502, configured to rotate the cover body 2 from the second position to the first position when the cover body 2 is placed on the housing 410' and is in the second position, such that the limiting part 22 of the cover body 2 enters the accommodating part 12 on one side, far away from the inside of the housing 410', of the housing 410', and separation of the cover body 2 and the housing 410' is limited; wherein in the second position, the limiting part 22 and the accommodating part 12 are misplaced along the circumferential direction of the through hole 11.

Compared with the traditional manner in which the liquid injection hole is closed through laser welding, in the present disclosure, not only the welding process is avoided, but also the plurality of processes of cleaning of welding slags and drying of liquid residual from cleaning caused by welding are avoided. The device can simply and efficiently manufacture batteries, and further improve assembly efficiency of the battery.

In some embodiments, the liquid injection device 500 further includes: a sealing element disassembly and assembly mechanism 503, configured to install the sealing element 3 on the housing 410' or the cover body 2, or remove the sealing element 3 from the housing 410' or the cover body 2.

Through the embodiment, the sealing element 3 can be conveniently disassembled and assembled in the processes of battery assembly and secondary liquid injection, to improve the disassembly and assembly efficiency, reduce pollution to the sealing element 3, and prolong service life of the sealing element 3.

In some embodiments, the cover body disassembly and assembly mechanism 502 is configured to rotate the cover body 2 from the first position to the second position, such that the limiting part 22 is misplaced from the accommodating part 12 along the circumferential direction of the through hole 11, to separate the cover body 2 from the housing 410'.

The device can flexibly and conveniently assist in disassembly and assembly of the cover body 2 in the production and assembly of the battery and secondary liquid injection processes, the operation is simple, so as to improve assembly efficiency of the battery, and shorten maintenance time required during secondary liquid injection of the battery, and when the performance of the battery is lowered, liquid can be supplemented timely, to ensure operating performance of the battery.

In some embodiments, the sealing element disassembly and assembly mechanism 503 is further configured to remove the sealing element 3 from the housing or the cover body 2 after the cover body 2 is separated from the housing 410'.

In the present embodiment, the sealing element 3 can be conveniently removed from the housing 410' or the cover body 2, to conveniently pour out electrolyte inside the housing 410', for fear that electrolyte flows onto the sealing element 3, then the sealing element 3 can be kept clean, and the service life is prolonged.

Protection subjects and features in each embodiment in the above application can be used for reference with each other, when the structure allows, those skilled in the art can also flexibly combine technical features in different embodiments, to form more embodiments.

A brief introduction is given above on an end cover assembly, a battery, and a device using the battery provided in the present disclosure. In the preset text, specific embodiments are used to elaborate principles and embodiments of the present disclosure, and the description of the above embodiments is merely for helping to understand method of the present disclosure and core ideas thereof. It should be indicated that, under the premise of not departing from principles of the present disclosure, those skilled in the art can also make numerous improvements and modifications to the present disclosure, and these improvements and modifications also fall within the protection scope of the claims of the present disclosure.

What is claimed is:

1. A secondary battery, comprising a shell and an end cover assembly, wherein the end cover assembly covers an opening of the shell to form a housing assembly of the secondary battery, wherein the end cover assembly comprises: an end cover, provided with a through hole for injection of electrolyte and an accommodating part, wherein the accommodating part is arranged on a side, far away from the shell, of the end cover and is arranged along a circumferential direction of the through hole; a sealing element, sealing the through hole; and a cover body, covering at least part of the sealing element, wherein the cover body is rotatable and comprises a limiting part, wherein when the cover body rotates to a first position, the limiting part is located inside the accommodating part to limit separation of the cover body from the end cover, and wherein when the cover body rotates to a second position, the limiting part and the accommodating part are misplaced along the circumferential direction of the through hole, to realize separation of the cover body from the end cover.

2. The secondary battery as claimed in claim 1, wherein the cover body further comprises a main body part which covers at least part of the sealing element, and
wherein the limiting part is connected to the main body part and extends along a radial direction of the through hole.

3. The secondary battery as claimed in claim 2, wherein there are a plurality of limiting parts, and the plurality of limiting parts are arranged at intervals along a circumferential direction of the main body part.

4. The secondary battery as claimed in claim 1, wherein the end cover further comprises a guiding part communicated with the accommodating part, and the limiting part is configured to enter the accommodating part via the guiding part, or be detachable from the end cover via the guiding part.

5. The secondary battery as claimed in claim 1, wherein the accommodating part comprises a first limiting wall, a second limiting wall arranged opposite to the first limiting wall, and a side wall which connects the first limiting wall and the second limiting wall.

6. The secondary battery as claimed in claim 5, wherein when the cover body rotates to the first position, the first limiting wall abuts against the limiting part to limit separation of the cover body from the end cover.

7. The secondary battery as claimed in claim 5, wherein at least one of the limiting part, the first limiting wall, and the second limiting wall is provided with an inclined surface, and the inclined surface is configured to guide the limiting part to enter the accommodating part.

8. The secondary battery as claimed in claim 1, wherein the end cover comprises a main body of end cover and an installation part, and
wherein the installation part is arranged on a surface of the main body of end cover and is arranged to surround the through hole, and the accommodating part is arranged in the installation part or enclosed by the installation part and the main body of end cover.

9. The secondary battery as claimed in claim 8, wherein a first groove is arranged on a surface, far away from the shell, of the main body of end cover, and the installation part is fixed in the first groove.

10. The secondary battery as claimed in claim 8, wherein the accommodating part is formed on an inner side of the installation part,
wherein the cover body comprises a main body part which covers at least part of the sealing element,
wherein the main body part is arranged in an opening which is formed in the installation part and surrounds the through hole, and the opening is communicated with the accommodating part, and
wherein the limiting part is connected to an outer side of the main body part and extends along a radial direction of the through hole.

11. The secondary battery as claimed in claim 8, wherein the accommodating part is formed on the outer side of the installation part,
wherein the cover body comprises a main body part which covers at least part of the sealing element, and the main body part is sleeved outside the installation part, and
wherein the limiting part is connected to an inner side of the main body part and extends along a radial direction of the through hole.

12. The secondary battery as claimed in claim 1, wherein the end cover is provided with an opening which surrounds the through hole, and the opening is arranged on a side, far away from the shell, of the through hole,
wherein the accommodating part is formed on a side of the opening,
wherein the cover body comprises a main body part which covers at least part of the sealing element, and the main body part is arranged in the opening, and
wherein the limiting part is connected to the outer side of the main body part and extends along a radial direction of the through hole.

13. The secondary battery as claimed in claim 1, wherein a stopping part is arranged in the accommodating part to limit maximum rotation stroke of the limiting part.

14. The secondary battery as claimed in claim 1, wherein a limiting structure is arranged between the limiting part and the accommodating part, and the limiting structure is configured to limit misplacement and separation between the cover body and the accommodating part when the cover body is arranged in the first position.

15. The secondary battery as claimed in claim 14, wherein the limiting structure comprises:
- a limiting opening, arranged on one of the limiting part and the accommodating part; and
- a convex part, clamped with the limiting opening, and arranged on the other of the limiting part and the accommodating part.

16. The secondary battery as claimed in claim 1, wherein a rotation angle of the cover body from the first position to the second position is less than 180°.

17. The secondary battery as claimed in claim 1, wherein the cover body is in contact with the sealing element, and a friction coefficient of a contact surface between the sealing element and the cover body is less than a friction coefficient of a contact surface between the sealing element and the end cover.

18. The secondary battery as claimed in claim 1, wherein in an axial direction of the through hole, a protruding part is arranged on a surface at which at least one of the cover body and the end cover is in contact with the sealing element, and the cover body abuts against the sealing element, such that the sealing element abuts against the protruding part.

19. A battery pack, comprising a plurality of secondary batteries as claimed in claim 1.

20. A device using the battery, comprising the secondary battery as claimed in claim 1, wherein the secondary battery is configured to provide electric energy.

\* \* \* \* \*